(12) United States Patent
Hong et al.

(10) Patent No.: US 12,001,940 B2
(45) Date of Patent: *Jun. 4, 2024

(54) IDENTIFYING MICROORGANISMS USING THREE-DIMENSIONAL QUANTITATIVE PHASE IMAGING

(71) Applicant: Tomocube, Inc., Daejeon (KR)

(72) Inventors: Kihyun Hong, Daejeon (KR); Hyun-Seok Min, Daejeon (KR); YongKeun Park, Daejeon (KR); Geon Kim, Daejeon (KR); Youngju Jo, Daejeon (KR)

(73) Assignee: Tomocube, Inc., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,872

(22) Filed: Sep. 23, 2022

(65) Prior Publication Data
US 2023/0013209 A1 Jan. 19, 2023

Related U.S. Application Data

(63) Continuation of application No. 17/431,871, filed as application No. PCT/IB2019/058248 on Sep. 27, 2019.
(Continued)

(51) Int. Cl.
*G06N 3/045* (2023.01)
*G06T 7/00* (2017.01)

(52) U.S. Cl.
CPC .......... *G06N 3/045* (2023.01); *G06T 7/0012* (2013.01); *G06T 2207/10056* (2013.01)

(58) Field of Classification Search
CPC . G06T 2207/10056; G06T 2207/20084; G06T 2207/30024
See application file for complete search history.

(56) References Cited

U.S. PATENT DOCUMENTS 10,082,653 B1 9/2018 Liu et al.
2017/0357084 A1 12/2017 Park et al.
(Continued)

FOREIGN PATENT DOCUMENTS

JP 2018-92560 6/2018
WO WO2017053592 3/2017
(Continued)

OTHER PUBLICATIONS

G. Kim et al., "Automated Identification of Bacteria using Three-Dimensional Holographic Imaging and Convolutional Neural Network," 2018 IEEE Photonics Conference (IPC), Reston, VA, USA, 2018, pp. 1-2, doi: 10.1109/IPCon.2018.8527133. (Year: 2018).*

(Continued)

*Primary Examiner* — Gandhi Thirugnanam
(74) *Attorney, Agent, or Firm* — Fish & Richardson P.C.

(57) ABSTRACT

Methods, systems, and apparatus, including computer programs encoded on a computer storage medium, for identifying the predicted type of one or more microorganisms. In one aspect, a system comprises a phase-contrast microscope and a microorganism classification system. The phase-contrast microscope is configured to generate a three-dimensional quantitative phase image of one or more microorganisms. The microorganism classification system is configured to process the three-dimensional quantitative phase image using a neural network to generate a neural network output characterizing the microorganisms, and thereafter identify the predicted type of the microorganisms using the neural network output.

20 Claims, 13 Drawing Sheets

Related U.S. Application Data

(60) Provisional application No. 62/856,290, filed on Jun. 3, 2019, provisional application No. 62/817,680, filed on Mar. 13, 2019.

(56) References Cited

U.S. PATENT DOCUMENTS

| | | | |
|---|---|---|---|
| 2018/0157966 A1 | 6/2018 | Henry et al. | |
| 2018/0322634 A1 | 11/2018 | Zimmerman et al. | |
| 2019/0056296 A1* | 2/2019 | Lee | G01N 33/574 |
| 2020/0394794 A1* | 12/2020 | Park | G01B 9/021 |
| 2021/0303818 A1* | 9/2021 | Randolph | G06N 5/045 |
| 2022/0156561 A1* | 5/2022 | Hong | G06V 20/698 |
| 2022/0180515 A1* | 6/2022 | Zhou | G06T 7/0012 |
| 2022/0383562 A1* | 12/2022 | Park | G06T 11/005 |
| 2022/0383986 A1* | 12/2022 | Popescu | G16H 30/40 |

FOREIGN PATENT DOCUMENTS

| | | |
|---|---|---|
| WO | WO2019018693 | 1/2019 |
| WO | WO2019032723 | 2/2019 |

OTHER PUBLICATIONS

Lee K, Kim K, Jung J, Heo J, Cho S, Lee S, Chang G, Jo Y, Park H, Park Y. Quantitative phase imaging techniques for the study of cell pathophysiology: from principles to applications. Sensors (Basel). Mar. 28, 2013;13(4):4170-91. doi: 10.3390/s130404170. PMID: 23539026; PMCID: PMC3673078. (Year: 2013).*

Jung J, Hong SJ, Kim HB, Kim G, Lee M, Shin S, Lee S, Kim DJ, Lee CG, Park Y. Label-free non-invasive quantitative measurement of lipid contents in individual microalgal cells using refractive index tomography. Sci Rep. Apr. 25, 2018;8(1):6524. doi: 10.1038/s41598-018-24393-0. PMID: 29695726; (Year: 2018).*

Seungwoo Shin, Kyoohyun Kim, Jonghee Yoon, and YongKeun Park, "Active illumination using a digital micromirror device for quantitative phase imaging," Opt. Lett. 40, 5407-5410 (2015) (Year: 2015).*

Catalin Chiritescu and Gabriel Popescu, 3D Imaging of Live Specimens Quantitative Phase Imaging with SLIM and GLIM, 2018, Imaging & Microscopy,p. 1-9 (Year: 2018).*

Jo Y, Park S, Jung J, Yoon J, Joo H, Kim MH, Kang SJ, Choi MC, Lee SY, Park Y. Holographic deep learning for rapid optical screening of anthrax spores. Sci Adv. Aug. 4, 2017;3(8):e1700606. doi: 10.1126/sciadv.1700606. PMID: 28798957; PMCID: PMC5544395. (Year: 2017).*

Nguyen, T.H., Kandel, M.E., Rubessa, M et al. Gradient light interference microscopy for 3D imaging of unlabeled specimens. Nat Commun 8, 210 (2017). https://doi.org/10.1038/s41467-017-00190-7 (Year: 2017).*

Park, Y., Depeursinge, C. & Popescu, G. Quantitative phase imaging in biomedicine. Nature Photon 12, 578-589 (2018). https://doi.org/10.1038/s41566-018-0253-x (Year: 2018).*

Adhikari et al., "Critical care and the global burden of critical illness in adults," The Lancet, Oct. 2010, 376(9749): 1339-1346.

Akhi et al., "Antibiotic susceptibility pattern of aerobic and anaerobic bacteria isolated from surgical site infection of hospitalized patients," Jundishapur Journal of Microbiology, Jul. 2015, 8(7):e20309, 6 pages.

Anand et al., "Automated Disease Identification With 3-D Optical Imaging: A Medical Diagnostic Tool," Proceedings of the IEEE, Mar. 2017, 105(5):924-946.

Charriere et al., "Cell refractive index tomography by digital holographic microscopy," Optics Letters, Jan. 2006, 31(2):178-180.

Chattopadhyay et al., "Grad-CAM++: Generalized gradient-based visual explanations for deep convolutional networks," 2018 IEEE Winter Conference on Applications of Computer Vision (WACV), Mar. 2018, pp. 839-847.

Chen et al., "Deep Learning in Label-free Cell Classification," Scientific Reports, Mar. 2016, 6(1), 6 pages.

Claydon et al., "The rapid identification of intact microorganisms using mass spectrometry," Nature Biotechnology, Nov. 1996, 14(11):1584-1586.

Cleven et al., "Identification and characterization of bacterial pathogens causing bloodstream infections by DNA microarray," Journal of Clinical Microbiology, Jul. 2006, 44(7): 2389-2397.

Extended European Search Report issued in European Application No. 19919488.7, dated Jan. 31, 2022, 9 pages.

Ferreira et al. "Direct identification of urinary tract pathogens from urine samples by matrix-assisted laser desorption ionization-time of flight mass spectrometry," Journal of Clinical Microbiology, Jun. 2010, 48(6):2110-2115.

Fonkwo, "Pricing infectious disease: The economic and health implications of infectious diseases," EMBO reports, Jul. 2008, 9(S1): S13-17.

Gallanos et al., "Preparation and properties of antisera against the lipid-A component of bacterial lipopolysaccharides," European Journal of Biochemistry, Dec. 1971, 24(1):116-122.

Hoentjen et al., "Antibiotics with a selective aerobic or anaerobic spectrum have different therapeutic activities in various regions of the colon in interleukin 10 gene deficient mice," Gut, Dec. 2003, 52(12):1721-1727.

Huang et al., "Densely connected convolutional networks," Proceedings of the IEEE Conference on Computer Vision and Pattern Recognition, 2017, 4700-4708.

Järvinen et al., "Rapid identification of bacterial pathogens using a PCR-and microarray-based assay," BMC Microbiology, Dec. 2009, 9(1):161, 6 pages.

Javidi et al., "Three-dimensional imaging and recognition of microorganism using single-exposure on-line (SEOL) digital holography," Opt Express, Jun. 2005, 13(12):4492-4506.

Jo et al., "Angle-resolved light scattering of individual rod-shaped bacteria based on Fourier transform light scattering," Scientific Reports, May 2014, 4(1):1-6.

Jo et al., "Holographic deep learning for rapid optical screening of anthrax spores," Science Advances, Aug. 2017, 3(8), 10 pages.

Jo et al., "Label-free identification of individual bacteria using Fourier transform light scattering," Opt Express, Jun. 2015, 23(12):15792-15805.

Jo et al., "Quantitative Phase Imaging and Artificial Intelligence: A Review," IEEE Journal of Selected Topics in Quantum Electronics, Aug. 2018, 25(1):1-4.

Kang et al., "Bloodstream infections caused by antibiotic-resistant gram-negative bacilli: risk factors for mortality and impact of inappropriate initial antimicrobial therapy on outcome," Antimicrobial Agents and Chemotherapy, Feb. 2005, 49(2):760-766.

Kim et al., "Automated Identification of Bacteria Using Three-Dimensional Holographic Imaging and Convolutional Neural Network," 2018 IEEE Photonics Conference (IPC), Sep. 2018, 2 pages.

Kim et al., "Correlative three-dimensional fluorescence and refractive index tomography: bridging the gap between molecular specificity and quantitative bioimaging," Biomedical Optics Express, Dec. 2017, 8(12):5688-5697.

Kim et al., "Learning-based screening of hematologic disorders using quantitative phase imaging of individual red blood cells," Biosensors and Bioelectronics, Jan. 2019, 123:69-76.

Kim et al., "High-resolution three-dimensional imaging of red blood cells parasitized by Plasmodium falciparum and in situ hemozoin crystals using optical diffraction tomography," Journal of Biomedical Optics, Jun. 2013, 19(1):011005, 13 pages.

Kingma et al., "Adam: A method for stochastic optimization," arXiv preprint arXiv:1412.6980, Dec. 2014, 15 pages.

Lai et al., "A DenseNet-based diagnosis algorithm for automated diagnosis using clinical ECG data," Journal of Southern Medical University, Jan. 2019, 39(1):69-75 (with English Abstract).

LeCun et al., "Deep learning," Nature, May 2015, 521(7553):436-444.

Li et al., "Imaging through glass diffusers using densely connected convolutional networks," Optica, Jul. 2018, 5(7):803-813.

Liu et al., "Hospital deaths in patients with sepsis from 2 independent cohorts," Jama, Jul. 2014, 312(1):90-92.

(56) References Cited

OTHER PUBLICATIONS

Morata et al., "Influence of multidrug resistance and appropriate empirical therapy on the 30-day mortality rate of Pseudomonas aeruginosa bacteremia," Antimicrobial Agents and Chemotherapy, Sep. 2012, 56(9):4833-4837.
Morens et al., "Emerging infectious diseases: threats to human health and global stability,". PLOS pathogens, Jul. 2013, 9(7), 3 pages.
Nadkarni et al., "Determination of bacterial load by real-time PCR using a broad-range (universal) probe and primers set," Microbiology, Jan. 2002, 148(1):257-266.
Neguţ et al., "Experimental approach for bacteriophage susceptibility testing of planktonic and sessile bacterial populations—Study protocol," Germs, Dec. 2014, 4(4): 92.
Paul et al., "Systematic review and meta-analysis of the efficacy of appropriate empiric antibiotic therapy for sepsis," Antimicrobial Agents and Chemotherapy, Nov. 2010, 54(11):4851-4863.
PCT International Preliminary Report on Patentability issued in International Application No. PCT/IB2019/058248 dated Sep. 23, 2021, 10 pages.
PCT International Search Report and Written Opinion issued in International Application No. PCT/IB2019/058248 dated Jan. 9, 2020, 11 pages.
Pitt et al., "Rapid separation of bacteria from blood-review and outlook," Biotechnology Progress, Jul. 2016, 32(4):823-839.
Ranjbar et al., "DNA microarray for rapid detection and identification of food and water borne Bacteria: from dry to wet lab," The Open Microbiology Journal, Nov. 2017, 11: 330-338.
Rice, "Antimicrobial resistance in gram-positive bacteria," American Journal of Infection Control, Jun. 2006, 34(5):S11-S19.
Shin et al., "Active illumination using a digital micromirror device for quantitative phase imaging," Optics Letters, Nov. 2015, 40(22):5407-5410.
Smith et al., "Global rise in human infectious disease outbreaks," Journal of The Royal Society Interface, Dec. 2014, 11(101): 6 pages.
Van der Maaten et al., "Visualizing Data using t-SNE," Journal of Machine Learning Research, Nov. 2008, 9(86):2579-2605, 27 pages.
Vercruysse et al., "Three-part differential of unlabeled leukocytes with a compact lens-free imaging flow cytometer," Lab Chip, 2015, 15(4):1123-1132.
Vouga et al., "Emerging bacterial pathogens: the past and beyond," Clinical Microbiology and Infection, Jan. 2016, 22(1): 12-21.
Walsh et al., "Activity and mechanisms of action of selected biocidal agents on Gram-positive and-negative bacteria," Journal of Applied Microbiology, Feb. 2003, 94(2):240-247.
Wu et al., "The social impact of pathogen threat: How disease salience influences conformity," Personality and Individual Differences, Jul. 2012, 53(1): 50-54.
Yoon et al., "Identification of non-activated lymphocytes using three-dimensional refractive index tomography and machine learning," Scientific Reports, Jul. 2017, 7(1):1-10.
Zhou et al., "Holistic brain tumor screening and classification based on densenet and recurrent neural network," International MICCAI Brainlesion Workshop, Sep. 2018, 10 pages.
Japanese Notice of Reasons for Refusal, with machine-generated translation, for corresponding JP Appl No. 2021-555105, dated Aug. 29, 2023.
YoungJu Jo et al., Quantitative Phase Imaging and Artificial Intelligence: A Review, IEEE Journal of Selected Topics in Quantum Electronics, vol. 25, No. 1, 2018, 6800914 (p. 1 /14), DOI: 10.1109/JSTQE.2018.2859234.
Japanese Notice of Reasons for Refusal, with formal translation, for corresponding JP Appl No. 2021-555105, dated Aug. 29, 2023.
Çiçek et al., "3D U-Net: Learning Dense Volumetric Segmentation from Sparse Annotation," CoRR, submitted on Jun. 2016, arXiv:1606.06650, 8 pages.
Lu et al., "A 3D Convolutional Neural Network for Volumetric Image Semantic Segmentation," In Proceedings of the 43rd North American Manufacturing Research Conference (NAMRC 43), Jun. 8-12, 2015, North Carolina, USA, 39:422-428.
Qi et al., "Volumetric and Multi-view CNNs for Object Classification on 3D Data," 2016 IEEE Conference on Computer Vision and Pattern Recognition (CVPR), Las Vegas, NV, Jun. 27-30, 2016, 5648-5656.
Japanese Notice of Reasons for Refusal, for corresponding JP Appl. No. 2021-555105, dated Jan. 23, 2024, 12 pages (with English translation).

\* cited by examiner

IDENTIFYING MICROORGANISMS USING THREE-DIMENSIONAL QUANTITATIVE PHASE IMAGING

CROSS-REFERENCE TO RELATED APPLICATIONS

This application is a continuation of, and claims benefit under 35 USC 120 to, U.S. application Ser. No. 17/431,871, filed Aug. 18, 2021, which is a national stage application under 35 U.S.C. § 371 of PCT International Application No. PCT/IB2019/058248, filed on Sep. 27, 2019, which claims the benefit of U.S. Provisional Patent Application Ser. No. 62/817,680, filed Mar. 13, 2019, and entitled "RAPID IDENTIFICATION OF BIOLOGICAL ENTITIES" and to U.S. Provisional Patent Application 62/856,290, filed Jun. 3, 2019, and entitled "IDENTIFYING MICROORGANISMS USING THREE-DIMENSIONAL QUANTITATIVE PHASE IMAGING". The disclosure of the prior applications are considered part of and are incorporated by reference in the disclosure of this application.

FIELD

This specification relates to identifying microorganisms using three-dimensional (3D) quantitative phase imaging. This specification incorporates by reference in its entirety U.S. Ser. No. 62/817,680, entitled "Rapid identification of biological entities," and filed on Mar. 13, 2019.

BACKGROUND

The term microorganism can refer to, e.g., bacteria, viruses, or fungi. The type of a microorganism may refer to, e.g., the genus, species, strain, metabolism, morphology, motility, or any other appropriate characteristic of the microorganism.

Quantitative phase imaging characterizes a specimen by quantifying phase shifts induced in light passing through the specimen.

SUMMARY

This specification describes a method and apparatus for identifying a microorganism by processing a 3D quantitative phase image (QPI) of the microorganism using a neural network, e.g., a 3D convolutional neural network.

According to a first aspect there is provided a method for identifying the predicted type of one or more microorganisms. The method includes using a phase-contrast microscope to generate a three-dimensional quantitative phase image of one or more microorganisms, where the three-dimensional quantitative phase image includes a three-dimensional representation of the microorganisms. The three-dimensional quantitative phase image is processed using a convolutional neural network with one or more three-dimensional convolutional layers. The neural network is configured to process the three-dimensional quantitative phase image in accordance with trained parameter values of the neural network to generate a neural network output characterizing the microorganisms. The predicted type of the microorganisms is identified using the neural network output.

In some implementations, the neural network output includes a respective probability value for each of a predetermined number of microorganism types. The probability value for a given microorganism type indicates a likelihood that the microorganisms are of the given microorganism type.

In some implementations, the predicted type of the microorganisms is identified as the microorganism type with the highest probability value in the neural network output.

In some implementations, the neural network output includes a probability value of a microorganism type that indicates a likelihood that the microorganisms are of the microorganism type.

In some implementations, the predicted type of the microorganisms is selected from the group consisting of genus, species, strain, gram-stainability, metabolism, morphology, and motility.

In some implementations, the three-dimensional quantitative phase image of the microorganisms is a three-dimensional refractive index tomogram.

In some implementations, the microorganisms are selected from the group consisting of bacteria, viruses, fungi, parasites, and microalgae.

In some implementations, the microorganisms include bacteria that are present in a blood sample of a patient.

In some implementations, the method includes administering an antibiotic therapy to the patient based on the predicted type of the bacteria.

In some implementations, the phase-contrast microscope, quantitative phase microscopy, or digital holographic microscopy is used to generate phase and amplitude images of the microorganisms at each of multiple illumination angles, and a three-dimensional refractive index tomogram is reconstructed using the phase and amplitude images.

In some implementations, the method takes at most one hour.

According to a second aspect there is provided a method for identifying the predicted type of one or more microorganisms by processing a three-dimensional quantitative phase image of the one or more microorganisms using a neural network in accordance with trained parameter values of the neural network.

In some implementations, the neural network includes one or more three-dimensional convolutional layers.

In some implementations, the neural network is configured to generate a neural network output characterizing the microorganisms, and the predicted type of the microorganisms is identified based at least in part on the neural network output.

In some implementations, the method takes at most one hour.

According to a third aspect there is provided a method for identifying the predicted type of one or more microorganisms. The method includes providing a biological sample from a patient with a bacterial infection. A predicted type of bacteria in the patient is identified within one hour of obtaining the biological sample from the patient, by processing a three-dimensional quantitative phase image of one or more bacteria isolated from the biological sample using a neural network with one or more three-dimensional convolutional layers, in accordance with trained parameter values of the neural network, to generate a neural network output characterizing the bacteria. The predicted type of the bacteria is identified using the neural network output.

In some implementations, the biological sample includes a blood sample.

In some implementations, the predicted type of bacteria in the patient is identified within 45 minutes of providing the biological sample from the patient.

In some implementations, the predicted type of bacteria in the patient is identified within 30 minutes of providing the biological sample from the patient.

In some implementations, the predicted type of bacteria in the patient is identified within 15 minutes of providing the biological sample from the patient.

According to a fourth aspect there is provided a method for identifying the predicted type of one or more microorganisms. The method includes providing a biological sample from a patient suspected of having a bacterial infection. A predicted type of bacteria in the patient is identified within one hour of providing the biological sample from the patient by processing a three-dimensional quantitative phase image of one or more bacteria isolated from the biological sample using a neural network with one or more three-dimensional convolutional layers, in accordance with trained parameter values of the neural network, to generate a neural network output characterizing the bacteria. The predicted type of the bacteria is identified using the neural network output.

According to a fifth aspect there is provided a system that includes a phase-contrast microscope and a microorganism classification system. The phase-contrast microscope is configured to generate a three-dimensional quantitative phase image of one or more microorganisms, where the three-dimensional quantitative phase image includes a three-dimensional representation of the microorganisms. The microorganism classification system is configured to process the three-dimensional quantitative phase image using a neural network, where the neural network is a convolutional neural network with one or more three-dimensional convolutional layers, and the neural network is configured to process the three-dimensional quantitative phase image in accordance with trained parameter values of the neural network to generate a neural network output characterizing the microorganisms. The predicted type of the microorganisms is identified using the neural network output.

According to a sixth aspect there are provided one or more non-transitory computer readable storage media storing instructions that, when executed by one or more computers, cause the one or more computers to receive a three-dimensional quantitative phase image of one or more microorganisms that is generated using a phase-contrast microscope, where the three-dimensional quantitative phase image includes a three-dimensional representation of the microorganisms. The three-dimensional quantitative phase image is processed using a neural network, where the neural network is a convolutional neural network with one or more three-dimensional convolutional layers. The neural network is configured to process the three-dimensional quantitative phase image in accordance with trained parameter values of the neural network to generate a neural network output characterizing the microorganisms. The predicted type of the microorganisms is identified using the neural network output.

Particular embodiments of the subject matter described in this specification can be implemented so as to realize one or more of the following advantages.

The method described in this specification can enable microorganisms to be identified more rapidly and/or more consistently than some conventional methods.

For example, screening based on blood culture is a conventional method for identifying bacterial species. While blood culture can reveal the presence of the bacteria, it often takes hours to days for the bacteria to grow and form conspicuous colonies. Furthermore, mass spectroscopy or susceptibility tests against various antibiotics are typically used to determine the exact type of the bacteria. Other biochemical methods including the antiserum test, deoxyribonucleic acid (DNA) microarray, and real-time polymerase chain reaction (PCR) can identify the type of the bacteria. However, due to their reliance on biochemical reactions or molecule-specific signals, these conventional methods may also involve hour-long to day-long processes as well as maintenance and use of specialized biochemical agents.

In contrast, the technology described in this specification can (in some cases) enable accurate bacterial identification in under an hour. For example, advances in microfluidic engineering and antibody engineering have achieved isolation of bacteria within an hour from concentrations as low as that of blood in a patient with a bacterial infection. Acquiring a 3D QPI of a bacterial sample need not involve time-consuming processes such as culturing or staining, and the classification neural network consumes milliseconds or less to make predictions using the input data.

The technology described in this specification may enable microorganisms to be identified more consistently than some conventional methods because it can be less vulnerable to human factors during both measurement and analysis. For example, while some conventional methods rely on physical experiments performed by people, the technology described in this specification can exploit consistent measurements (i.e., generated using quantitative phase imaging) using computational techniques (i.e., a classification neural network).

By processing 3D QPIs, the technology described in this specification can (in some cases) identify microorganisms more accurately than would be possible by processing 2D QPIs. In particular, 2D QPIs corresponding to particular illumination angles often include noisy image artifacts resulting from interference caused by multiple reflections or scattering by dust particles. Images of microorganisms (e.g., bacteria) which are only hundreds of nanometers thick are especially vulnerable to such artifacts. The signal-to-noise (SNR) ratio of a 3D QPI reconstructed from multiple 2D QPIs may be higher than the 2D QPIs because the noisy artifacts are illumination angle-dependent whereas the influence of microorganisms remains consistent.

By using a 3D convolutional neural network, the technology described in this specification can (in some cases) identify microorganisms more accurately than would be possible by using, e.g., a 2D convolutional neural network or other machine learning model. In particular, the 3D convolutional neural network can be trained to exploit complex 3D spatial relationships between different portions of a 3D QPI to accurately identify microorganisms depicted in the 3D QPI.

Certain details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a microorganism classification system that can predict a type (e.g., species) of a microorganism (e.g., bacterium) by processing a three-dimensional (3D) quantitative phase image (QPI) of the microorganism using a 3D convolutional classification neural network. The microorganism classification system can be deployed in a clinical environment for diagnostic applications. These features and other features are described in more detail below.

Figure 1:
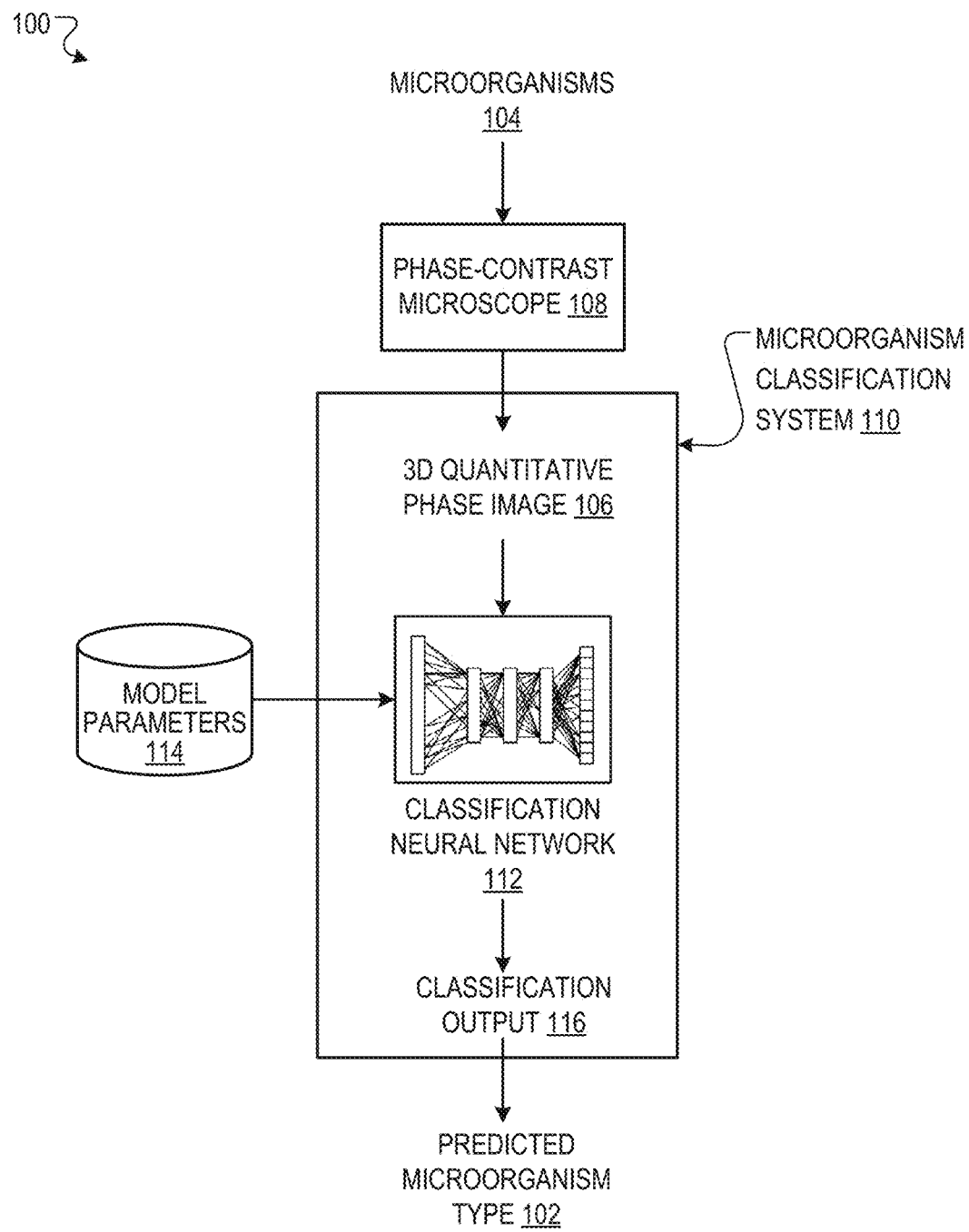
FIG. 1 is a block diagram of an example environment where the type of a set of one or more microorganisms is predicted from a 3D QPI of the microorganisms.

FIG. 1 is a block diagram of an example environment 100 where the type 102 of a set of one or more microorganisms 104 is predicted from a 3D QPI 106 of the microorganisms 104.

The microorganisms 104 may be bacteria, viruses, fungi, parasites, microalgae, or any other appropriate sort of microorganisms. The microorganisms 104 may be disease-causing (e.g., sepsis-inducing), but do not have to be.

The microorganisms 104 may originate from any of a variety of sources. For example, the microorganisms 104 may be bacteria (or fungi) obtained by processing a blood sample of a patient having a bacterial (or fungal) infection using a bacterial (or fungal) isolation technique, as will be described in more detail with reference to FIG. 4.

The predicted type 102 of the microorganisms 104 may define, e.g., a predicted species (e.g., *Acinobacter baumannii*, *Bacillus subtilis*, or *Enterobacter cloacae*), a predicted genus, a predicted strain, a predicted gram-stainability (e.g., gram-positive or gram-negative), a predicted metabolism (e.g., aerobic or anaerobic), a predicted morphology (e.g., coccus, bacillus, or coccobacillus), a predicted motility (e.g., motile or non-motile), or any other appropriate characteristic of the microorganisms.

Optionally, the predicted type 102 of the microorganisms 104 may define a prediction for multiple characteristics of the microorganisms 104. For example, the predicted type 102 of the microorganisms 104 may define both a predicted species of the microorganisms and a predicted motility of the microorganisms.

The environment 100 includes a phase-contrast microscope 108 and a microorganism classification system 110. The microorganism classification system 110 can be implemented as computer programs on one or more computers in one or more locations.

The phase-contrast microscope 108 is used to generate a 3D quantitative phase image 106 (i.e., 3D QPI 106) of the microorganisms 104. Broadly, the 3D QPI 106 is a 3D representation of the microorganisms 104 that characterizes their morphological and biophysical properties by quantifying phase shifts induced in light passing through the microorganisms 104.

Generally, the 3D QPI 106 of the microorganisms 104 can be represented as a 3D matrix of numerical values (e.g., floating point values), where each component of the 3D matrix corresponds to a respective 3D spatial position that is in or around the microorganisms 104. In one example, the 3D QPI 106 may be a "refractive index (RI) tomogram", where each component of the 3D matrix defines the refractive index of the material (e.g., portion of the microorganism) at the spatial position corresponding to the component.

The phase-contrast microscope 108 can generate the 3D QPI 106 of the microorganisms 104 using any of a variety of different techniques. An example method for generating the 3D QPI 106 of the microorganisms 104 using the phase-contrast microscope 108 is described in more detail with reference to FIG. 5.

The microorganism classification system 110 is configured to process the 3D QPI 106 of the microorganisms 104 using a classification neural network 112, in accordance with trained values of the model parameters 114 of the classification neural network 112, to generate a classification output 116. Thereafter, the microorganism classification system 110 identifies the predicted type 102 of the microorganisms 104 using the classification output 116. A few examples follow.

In one example, the classification output 116 defines a probability distribution over a predetermined number of possible microorganism types; that is, the classification output 116 includes a respective numerical probability value corresponding to each possible microorganism type. In this example, the system 110 may identify the predicted type 102 of the microorganisms 104 as the microorganism type associated with the highest probability value by the classification output 116.

In another example, the classification output 116 defines an index (e.g., positive integer value) from a predetermined set of possible indices, where each index corresponds to a respective possible microorganism type. In this example, the system 110 may identify the predicted type 102 of the microorganisms 104 as the microorganism type corresponding to the index defined by the classification output 116.

In some cases, the 3D QPI 106 generated by the phase-contrast microscope 108 may depict a large number (e.g., thousands) of microorganisms. For example, the phase-contrast microscope 108 may generate a 3D QPI 106 depicting thousands of microorganisms (e.g., bacteria) mounted on a microscope slide. The system 110 may detect individual microorganisms in the 3D QPI 106 (e.g., using an object detection neural network trained to detect microorganisms) and crop multiple regions from the 3D QPI 106 which each depict one or more respective microorganisms. For each region cropped from the 3D QPI 106, the system 110 may process the region using the classification neural network 112 to generate a respective classification output 116 that characterizes the one or more microorganisms depicted in the cropped region. Thereafter, the system 110 may generate an "overall" prediction for the type of microorganism depicted in the original 3D QPI 106 using the respective classification outputs generated for the cropped regions. A few examples follow.

In one example, the respective classification output 116 generated by the classification neural network 112 for each region cropped from the 3D QPI 106 defines a probability distribution over possible microorganism types (as described earlier). In this example, the system 110 may combine (e.g., average) the probability distributions over possible microorganism types generated for each of the regions cropped from the 3D QPI 106 to generate an "overall" probability distribution over possible microorganism types. The system 110 may identify the overall predicted type of the microorganisms depicted in the 3D QPI 106 as the microorganism type associated with the highest probability value by the overall probability distribution over possible microorganism types.

In another example, the respective classification output 116 generated by the classification neural network 112 for each region cropped from the 3D QPI 106 defines an index associated with a possible microorganism type (as described earlier). In this example, the system 110 may determine the index that occurs most frequently (i.e., the "mode index") in the set of indices generated by the classification neural network 112 for the regions cropped from the 3D QPI 106. The system 110 may identify the overall predicted type of the microorganisms depicted in the 3D QPI 106 as the possible microorganism type associated with the mode index.

Generating an overall prediction for the type of microorganism depicted in a 3D QPI by processing multiple regions cropped from the 3D QPI can improve the robustness of the system 110.

In some cases, rather than using a single classification neural network 112, the system 110 can use an ensemble of multiple classification neural networks 112 to determine the predicted microorganism type 102. The classification neural networks in the ensemble may differ from one another in any of a variety of ways. For example, some or all of the classification neural networks in the ensemble may have different neural network architectures, e.g., different 3D convolutional neural network architectures. As another example, some or all of the classification neural networks in the ensemble may be trained differently, e.g., by having their model parameter values initialized differently. Each classification neural network in the ensemble may process the 3D QPI 106 to generate a respective classification output 116, and the system 110 may generate an overall prediction for the type of microorganism depicted in the 3D QPI 106 using the respective classification outputs (as described earlier).

Optionally, one or more intermediate outputs generated by the classification neural network 112 by processing the 3D QPI 106 can be provided for use in characterizing the microorganisms 104. An intermediate output (which can also be referred to as a latent feature) refers to an output generated by an intermediate layer of the classification neural network 112 (i.e., a layer between the input layer and the output layer). An intermediate output can be represented as an ordered collection of numerical values, e.g., a vector or matrix of numerical values. Intermediate outputs generated by the classification neural network 112 can be used as compact descriptors of the 3D QPI 106 that can be processed by another machine learning model (e.g., a support vector machine (SVM) or random forest (RF)) to generate prediction outputs characterizing the microorganisms 104. FIG. 6B is an illustration of an example of some intermediate outputs (i.e., latent features) generated by the classification neural network 112.

The model parameters 114 of the classification neural network 112 refer to the parameters that define the operations performed by the layers of the classification neural network, e.g., the weight matrices and bias vectors of the layers of the classification neural network 112.

The classification neural network 112 can have any appropriate neural network architecture. For example, the classification neural network 112 may be a 3D convolutional neural network, that is, a neural network that includes one or more 3D convolutional layers. A 3D convolutional layer refers to a convolutional layer that is configured to process one or more 3D inputs (e.g., represented as 3D matrices of numerical values) using one or more 3D convolutional filters to generate one or more 3D outputs.

In addition to 3D convolutional layers, the classification neural network 112 may include additional neural network layers of any appropriate type (e.g., pooling or fully-connected layers) which are connected in any appropriate configuration. An example classification neural network architecture is described in more detail with reference to FIG. 7.

A training system can determine the trained values of the model parameters 114 of the classification neural network 112 by training the classification neural network 112 on a set of training examples. An example of a training system is described in more detail with reference to FIG. 2.

The phase-contrast microscope 108 and the microorganism classification system 110 can be deployed in a clinical environment for diagnostic applications. For example, as described with reference to FIG. 4, the phase-contrast microscope 108 and the microorganism classification system 110 can be used to identify appropriate antibiotic therapies for patients with bacterial infections.

Figure 2:
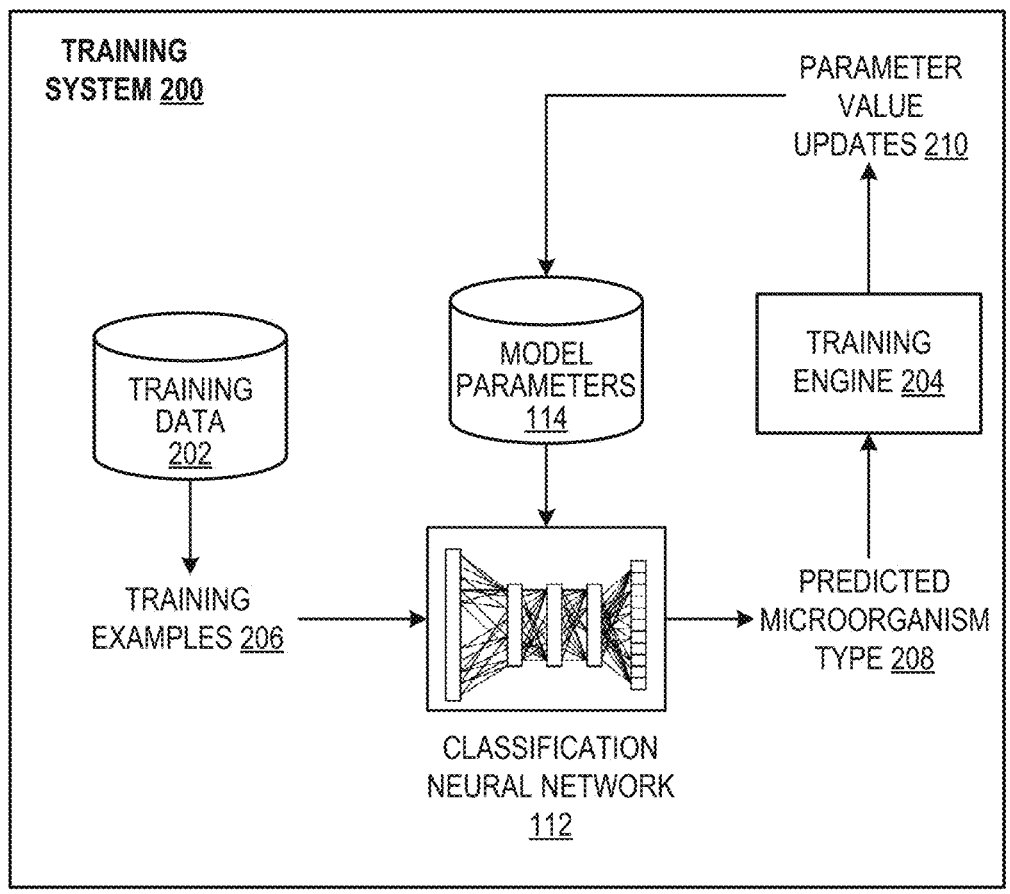
FIG. 2 shows an example training system.

FIG. 2 shows an example training system 200. The training system 200 is an example of a system implemented as computer programs on one or more computers in one or more locations in which the systems, components, and techniques described below are implemented.

The training system 200 uses a set of training data 202 and a training engine 204 to determined trained values of the model parameters 114 of the classification neural network 112.

The training data 202 includes multiple training examples. Each training example includes: (i) a 3D QPI of one or more microorganisms (e.g., bacteria), and (ii) a "target microorganism type" that defines the type of the microorganisms depicted in the 3D QPI. The target microorganism type specifies the classification output that should be generated by the classification neural network 112 by processing the 3D QPI.

Figure 3:
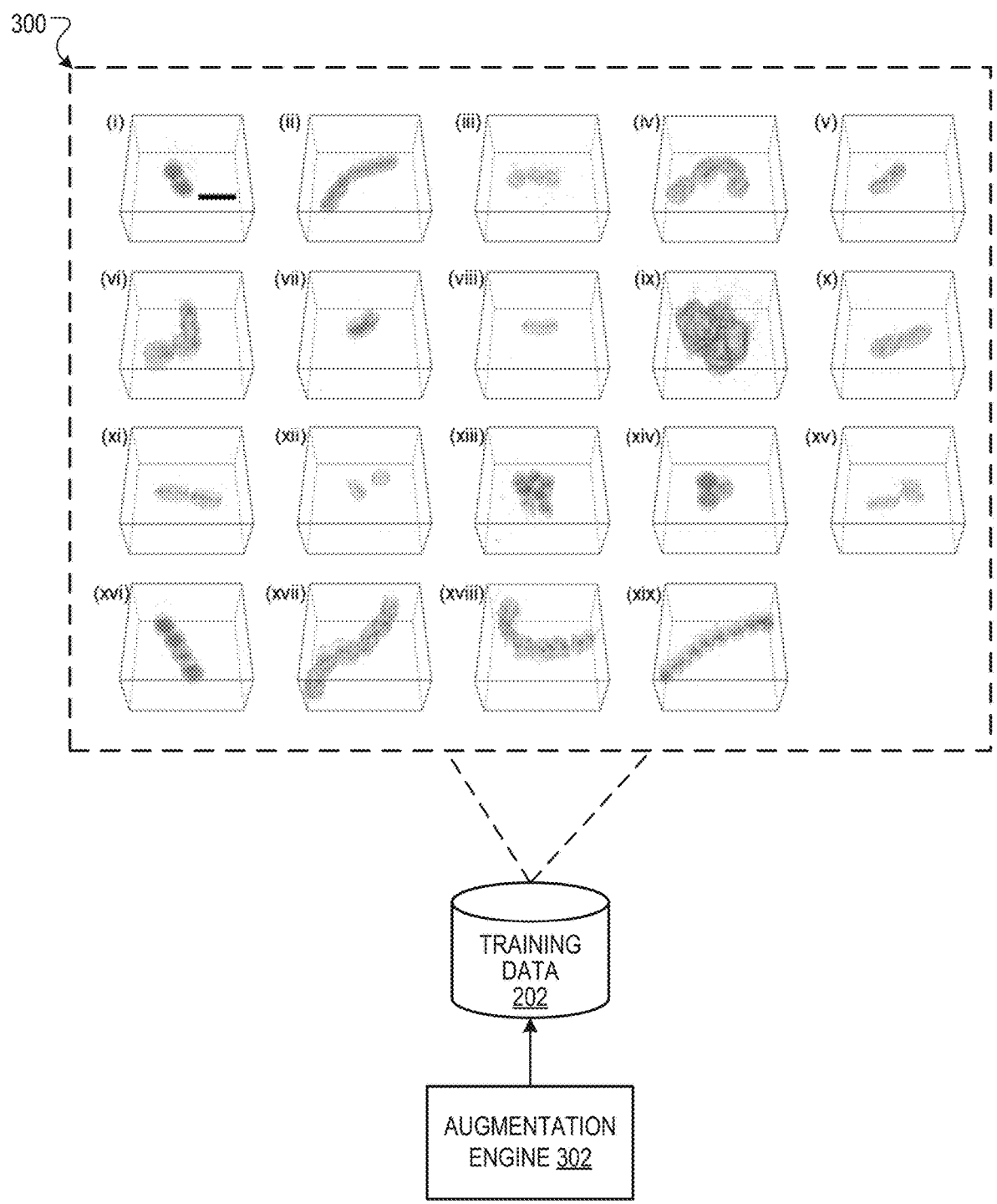
FIG. 3 is an illustration of an example set of training data.

Generally, the training data 202 includes at least one training example corresponding to each possible microorganism type (i.e., from the predetermined set of possible microorganism types that can be predicted by the classification neural network 112). FIG. 3 provides an illustration of an example set of training data 202.

The training engine 204 is configured to iteratively adjust the current values of the model parameters 114 of the classification neural network 112 at each of multiple training iterations.

At each training iteration, the training engine 204 selects (e.g., randomly samples) a batch (i.e., set) of one or more training examples 206 from the training data 202, and processes the 3D QPI included in each training example 206 to generate a corresponding predicted microorganism type 208.

The training engine 204 then determines a parameter value update 210 to the current values of the model parameters 114 based on: (i) the predicted microorganism types 208 generated by the classification neural network 112, and (ii) the target microorganism types specified by the training examples 206. More specifically, to determine the parameter value update 210 at the current training iteration, the training engine 204 determines a gradient of an objective function with respect to the model parameters 114 of the classification neural network 112. Generally, the objective function depends on the predicted microorganism types 208 generated by the classification neural network 112 and the target microorganism types specified by the training examples 206. The training engine 204 can determine the parameter value update 210 based on the gradient of the objective function, e.g., in accordance with the update rule of any appropriate gradient descent optimization algorithm (e.g., Adam or RMSprop).

The parameter value update 210 can be represented in any appropriate numerical format, for example, as an ordered collection of numerical values (e.g., a vector of numerical values) that include a respective numerical value corresponding to each model parameter 114 of the classification neural network 112. The training system 200 may determine the updated values of the model parameters 114 at the training iteration as the result of adding the parameter value update 210 to the current values of the model parameters 114.

The training engine 204 may determine the gradients of the objective function in any appropriate manner, for example, using backpropagation techniques. The objective function may be any appropriate classification objective function, e.g., a cross-entropy objective function.

The training system 200 may determine that the training of the classification neural network 112 is complete when a training termination criterion is met. For example, the training termination criterion may be that a predetermined number of training iterations have been performed. As another example, the training termination criterion may be that the accuracy of the classification neural network 112, evaluated on a held-out set of training examples, achieves at least a predetermined threshold value.

After determining that a training termination criterion is met, the training system 200 can provide the trained values of the model parameters 114 of the classification neural network 112 to the microorganism classification system 110 (i.e., described with reference to FIG. 1). The "trained values" of the model parameters 114 refer to the values of the model parameters 114 at the conclusion of the last training iteration performed by the training system 200.

The training system 200 may be located remotely from the microorganism classification system 110, in which case the training system 200 may provide the trained values of the model parameters 114 to the microorganism classification system, e.g., over a wired or wireless connection.

FIG. 3 is an illustration 300 of an example set of training data 202. The training examples of the training data 202 each include: (i) a 3D QPI of a sepsis-inducing bacterium, and (ii) a target microorganism type that defines the species of the bacterium.

The illustration 300 depicts an exemplar 3D QPI of a bacterium corresponding to each of 19 different sepsis-inducing species. In particular, ordered in accordance with the image labels (i) to (xix), the 3D QPIs in FIG. 3 respectively depict examples of: *A. baumannii, B. subtilis, E. cloacae, E. faecalis, E. coli, H. influenza, K. pneumonia, L. monocytogenes, M. luteus, P. mirabilis, P. aeruginosa, S. marcescens, S. aureus, S. epidermidis, S. maltophilia, S. agalactiae, S. anginosus, S. pneumonia*, and *S. pyogenes* bacteria.

Optionally, prior to using the training data 202 to train the classification neural network 112 (e.g., as described with reference to FIG. 2), the training data 202 can be "augmented" using an augmentation engine 302. More specifically, the augmentation engine 302 can process existing training examples in the training data 202 to generate "new" training examples that can subsequently be used to train the classification neural network 112.

To generate a new training example from an existing training example, the augmentation engine 302 can modify the 3D QPI image from the existing training example, e.g., by adding random noise values, rotating, elastically deforming, or translating the 3D QPI image from the existing training example. The new training example would include: (i) the modified 3D QPI image, and (ii) the same target microorganism type as the existing training example.

Training the classification neural network 112 using training data 202 that is augmented with new training examples generated using the augmentation engine 302 can improve the accuracy of the trained classification neural network, e.g., by mitigating the potential effects of over-fitting.

Figure 4:
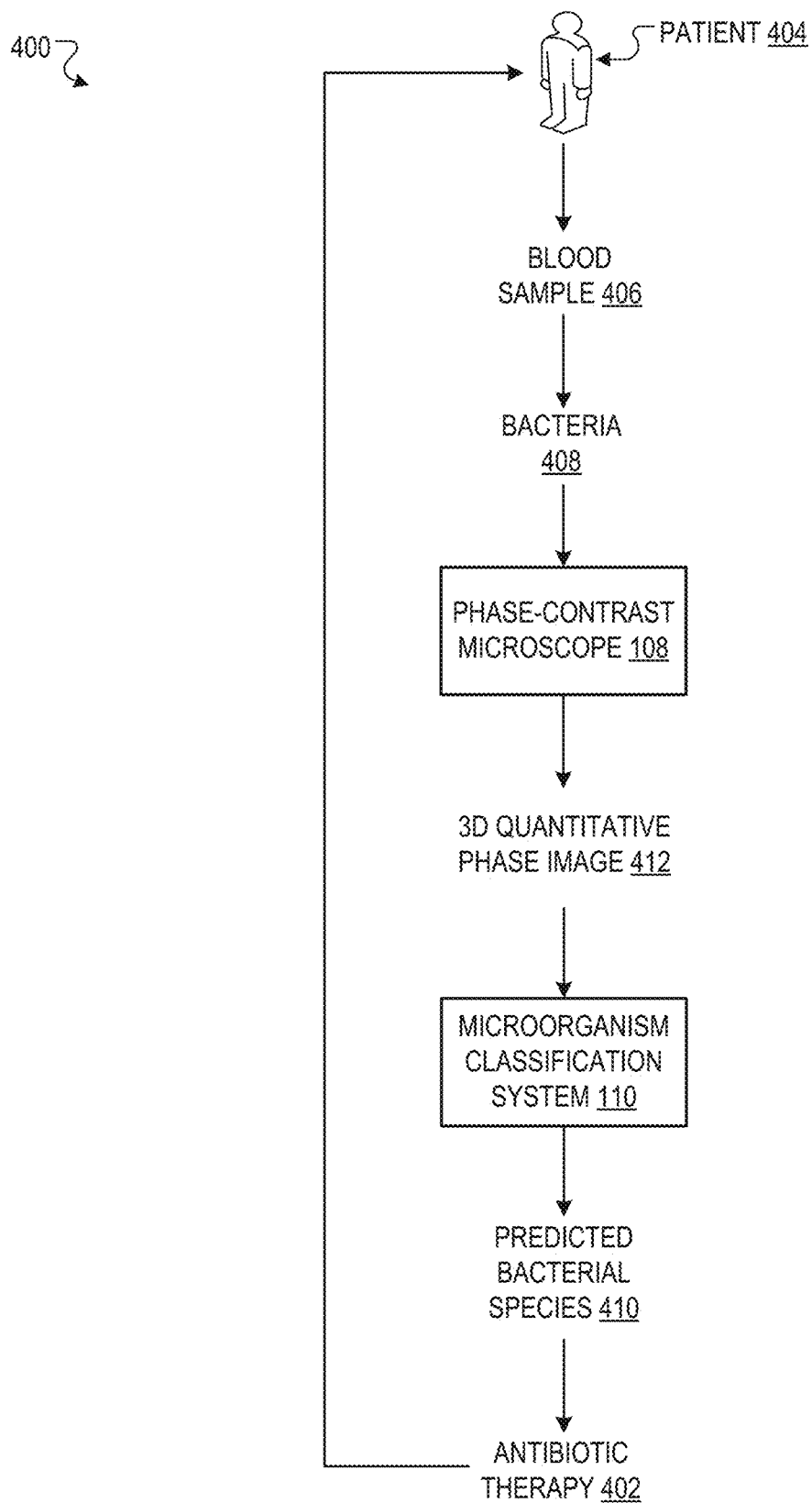
FIG. 4 is an illustration of an example process for using a phase-contrast microscope and a microorganism classification system to determine an antibiotic therapy appropriate for treating a patient with a bacterial infection.

FIG. 4 is an illustration of an example process 400 for using the phase-contrast microscope 108 and the microorganism classification system 110 (e.g., as described with reference to FIG. 1) to determine an antibiotic therapy 402 appropriate for treating a patient 404 with a bacterial infection.

A blood sample 406 from the patient 404 is provided, e.g., by drawing blood from the patient 404. For convenience, the description of FIG. 4 refers to a "blood sample", but other biological samples could be used, e.g., tissue biopsy samples (e.g., from stomach tissue), Pap smear samples (e.g., from the cervix), urine samples, stool samples, or saliva samples.

A bacterial isolation technique is applied to the blood sample 406 to isolate bacteria 408 contributing to the bacterial infection in the patient 404. That is, a bacterial isolation technique is applied to remove a sample of the bacteria 408 from the blood sample 406. Any appropriate bacterial isolation technique can be applied to the isolate the bacteria 408 to any appropriate level of purity. Examples of bacterial isolation techniques include centrifugation, filtration with a filter with pores, and isolation using a microfluidic or microchip device.

A phase-contrast microscope 108 is used to generate a 3D QPI 412 of the bacteria 408. For example, the phase-contrast microscope may generate a 3D refractive index tomogram of the bacteria 408 (as described earlier).

The microorganism classification system 110 processes the 3D QPI 412 of the bacteria 408 to generate an output that defines a predicted species 410 of the bacteria 408 contributing to the bacterial infection in the patient 404. The bacteria 408 may be, e.g., sepsis-inducing, malaria-inducing, or tuberculosis-inducing.

The predicted species 410 of the bacteria 408 is used to select an antibiotic therapy 402 (or other treatment) that is appropriate to treat the bacterial infection in the patient 404. In particular, an antibiotic therapy that is particularly effective at inhibiting or destroying the predicted bacterial species 410 can be selected.

The selected antibiotic therapy 402 can thereafter be used to treat the bacterial infection in the patient 404, e.g., by intravenously dosing the patient 404 with the selected antibiotics.

The process 400 can enable rapid identification of a bacterial species contributing to an infection in a patient. For example, advances in microfluidic engineering and antibody engineering have achieved isolation of bacteria within an hour from concentrations as low as that present in the blood of a patient with a bacterial infection. Acquiring a 3D QPI of a bacterial sample does not require time-consuming processes such as culturing or staining, and the microorganism classification system (in particular, the trained classification neural network) may consume milliseconds or less to make predictions using the input data. Therefore, in some cases, the process 400 can enable accurate bacterial identification in under an hour. In some particular cases, the process 400 can enable accurate bacterial identification in under 45 minutes, under 30 minutes, or under 15 minutes. After the bacteria 408 are isolated from the blood sample 406 (which may be the most time-consuming step of the process 400), generating the 3D QPI 412 and the prediction of the bacterial species 410 may occur in under 10 minutes, under 5 minutes, under 3 minutes, or under 1 minute, such as from one to 45 seconds (e.g., from one to 30 seconds, from one to 20 seconds, from one to 10 seconds).

In contrast, typical bacterial species identification in hospitals (i.e., without the benefit of 3D quantitative phase imaging and the microorganism classification system 110) can require 12 or more hours since blood culture and subsequent assays are involved.

Rapidly identifying the species of bacteria causing or contributing to an infection in a patient can enable appropriate antibiotics (i.e., antibiotics which effectively inhibit or destroy the species of bacteria) to be promptly administered to the patient. Promptly administering appropriate antibiotics to a patient with a bacterial infection can dramatically improve the clinical outcome for the patient.

For example, in some cases, saving the lives of sepsis patients depends on effectively treating the patients in the first few hours after admission. The mortality rate of a sepsis patient may surge as the initial antibiotic therapy is delayed. Therefore, rapid antibiotic therapies facilitated by 3D phase-contrast imaging and the microorganism classification system 110 can play a vital role in reducing the mortality rate of sepsis patients.

The process 400 is just one example of a setting where the phase-contrast microscope 108 and the microorganism classification system 110 can be used. A few other examples follow. In one example, the phase-contrast microscope 108 and the classification system 110 can be used to continuously monitor a hospitalized patient with an infectious disease, e.g., by predicting the species of bacteria that is currently contributing to the infectious disease at each of multiple time points. In another example, the phase-contrast microscope 108 and the classification system 110 can be used to identify a predicted species of bacteria present in agricultural environments (e.g., fish farms). In another example, the phase-contrast microscope 108 and the classification system 110 can be used to identify a predicted species of bacteria present in food products, a pharmaceutical products, or both.

Figure 5:
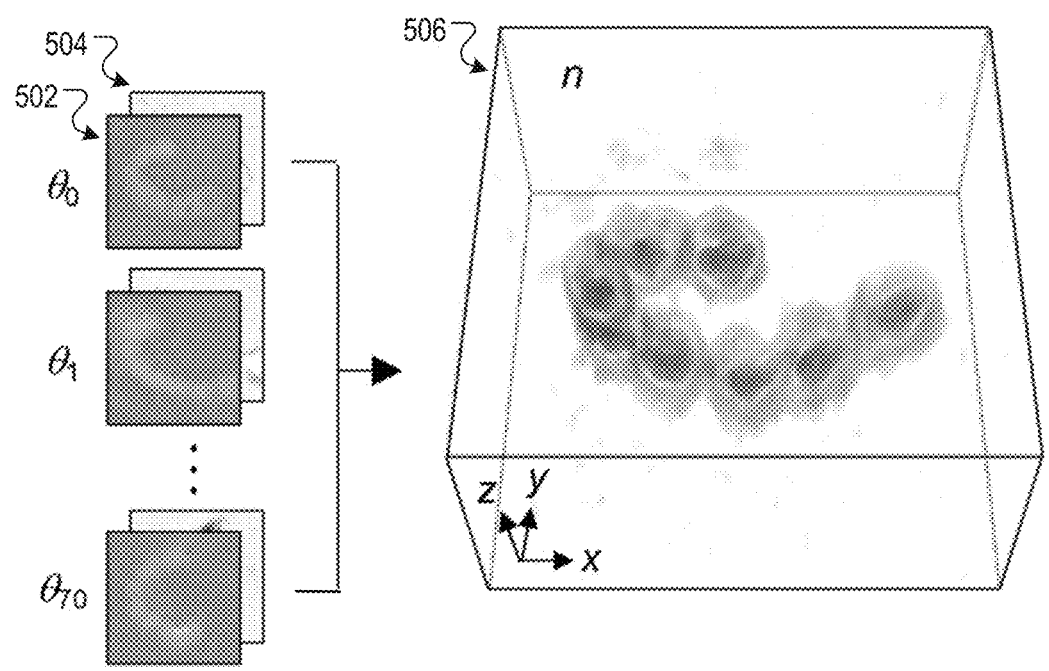
FIG. 5 is an illustration of an example process for generating a 3D QPI of a microorganism using a phase-contrast microscope.

FIG. 5 is an illustration of an example process for generating a 3D QPI of a microorganism using a phase-contrast microscope. Using a phase-contrast microscope, a respective phase image (e.g., the phase image 502) and a respective amplitude image (e.g., the amplitude image 504) of the microorganism are measured from multiple illumination angles (e.g., the illumination angles $\theta_1$-$\theta_{70}$). Then the 3D QPI (e.g., the 3D refraction index tomogram 506) is reconstructed based on the multi-angular set of phase and amplitude images using optical diffraction tomography (ODT) techniques (which can also be referred to as refractive index tomography techniques, tomographic phase microscopy techniques, and the like).

FIG. 6A-G illustrate the results of an experiment where a classification neural network was trained to predict the species of 19 kinds of sepsis-inducing bacteria from 3D QPIs of the bacteria. The 19 kinds of sepsis-inducing bacteria were: *A. baumannii*, *B. subtilis*, *E. cloacae*, *E. faecalis*, *E. coli*, *H. influenza*, *K. pneumonia*, *L. monocytogenes*, *M luteus*, *P mirabilis*, *P aeruginosa*, *S. marcescens*, *S. aureus*, *S. epidermidis*, *S. maltophilia*, *S. agalactiae*, *S. anginosus*, *S. pneumonia*, and *S. pyogenes* bacteria. In this experiment, the 3D QPIs were refractive index tomograms that each correspond to a cuboid region of $7.2\times7.2\times4.0$ μm$^3$, with one or more specimens of the labeled species inside the cuboid. The pixel size was 0.1, 0.1, and 0.2 μm in x, y, and z directions respectively. The architecture of the classification neural network used in this experiment is described in more detail with reference to FIG. 7. The experiments were run on 5041 3D RI tomograms of sepsis-inducing bacteria; for every species, the same number of tomograms were randomly assigned to the test set and the validation set.

The trained classification neural network was 94.6% accurate in the blind test of species classification. The average sensitivity, specificity, and precision for each species was 94.6%, 99.7% and 94.7% respectively. The sensitivity, specificity, and precision did not drop below 85% for any species. An error relating to the misclassification of *E. coli* as *K. pneumoniae* and the misclassification of *S. pneumoniae* as *S. pyogenes* occurred for 7.5% of *E. coli* and *S. pneumoniae* respectively. Four species including *H. influenzae*, *L. monocytogenes*, *P. aeruginosa*, *S. anginosus* were identified with 100% sensitivity. *P. mirabilis* had an identification sensitivity of 85%. *P. mirabilis*, *P. aeruginosa*, and *S. maltophilia* had an identification specificity of 100%. *E. coli* and *K. pneumonia* were had a specificity of 99.17%. Each of *P. mirabilis*, *P. aeruginosa*, and *S. maltophilia* had an identification precision of 100%. *E. coli* had an identification precision of 85.7%.

Figure 6A:
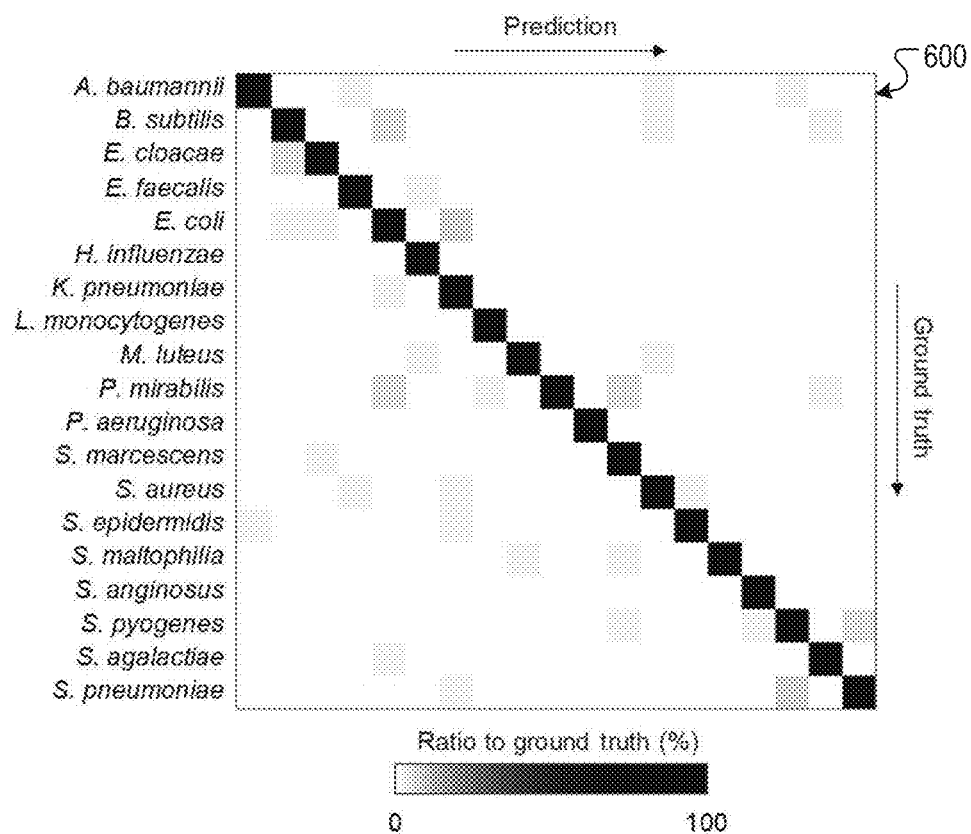
FIGS. 6A-G illustrate the results of an experiment where a classification neural network was trained to predict the species of 19 kinds of sepsis-inducing bacteria from 3D refractive index tomograms of the bacteria.
Figure 6B:
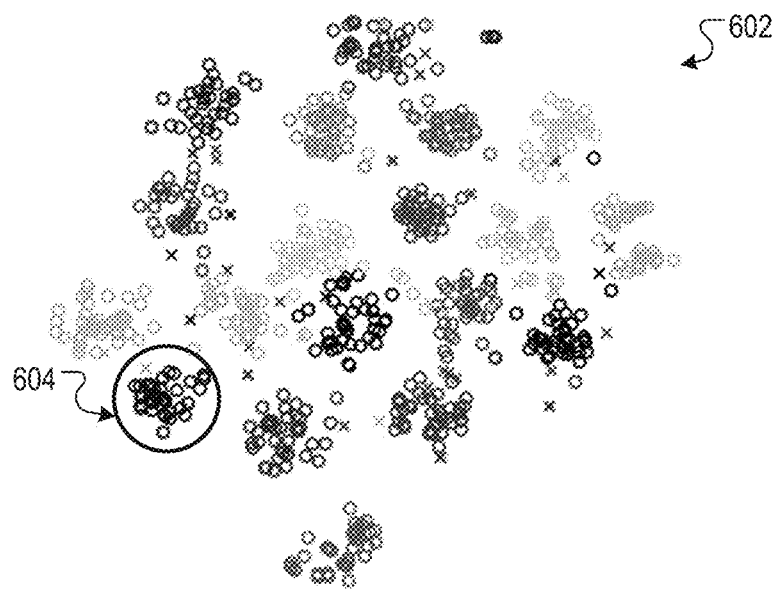

FIG. 6A is an illustration of a table 600 that characterizes the accuracy of the trained classification neural network. The shaded of the portion of the table 600 corresponding to the i-th row and the j-th column characterizes how frequently the classification neural network predicts that bacteria of the species corresponding to row i are of the species corresponding to row j.

FIG. 6B shows a scatter plot 602 that illustrates the "latent features" extracted by the trained classification neural network for 3D refractive index tomograms of different bacterial species. In particular, each point in the scatter plot is a representation of the input provided to the last fully-connected layer of the classification neural network (i.e., the fully-connected layer 730, as described with reference to FIG. 7) for a respective 3D refractive index tomogram. The high-dimensional latent features were mapped onto a two-dimensional (2D) plane using t-distributed stochastic neighbor embedding (t-SNE). The latent features corresponding to correctly classified 3D refractive index tomograms are depicted as circles, and the latent features corresponding to incorrectly classified 3D refractive index tomograms are depicted with an "x" symbol. It can be appreciated that the trained classification neural network generates latent features which cluster the 3D refractive index tomograms into respective groups in the latent feature space. Broadly, each of the clusters in the scatter plot correspond to a respective bacterial species. For example, the cluster 604 broadly corresponds to the 3D refractive index tomograms of *A. baumannii* bacteria (i.e., the majority of the points in the cluster 604 correspond to 3D refractive index tomograms of *A. baumannii* bacteria). The scatter plot 602 can also be shown to approximately cluster the 3D refractive index tomograms based on other characteristics, e.g., gram-stain-ability and metabolism.

Figure 6C:
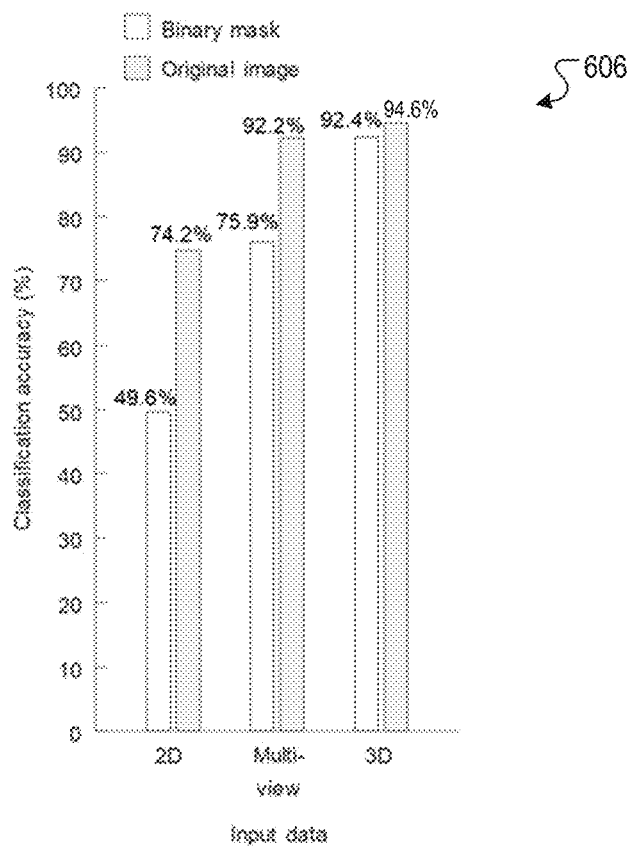

FIG. 6C shows a bar graph 606 that illustrates the accuracy of the classification neural network after it has been trained to process different forms of input data. A total of six types of data were compared: a 2D optical phase delay image, a set of 2D optical phase delay images from multiple illumination angles (i.e., that can be processed to generate a 3D RI tomogram), a 3D RI tomogram, and threshold-based binary masks of the three types of images (as illustrated with reference to FIG. 6D). The three types of images and the corresponding classification approaches are referred to in this specification as 2D, multi-view, and 3D. The thresholds in the 2D phase and 3D RI images were set to $0.057\pi$ and 1.3425 in order to accommodate a wide variety of phase and RI values in bacteria. In the multi-view and 2D approaches the classification neural network was a 2D convolutional neural network. In the multi-view approach, predictions of 2D images were ensemble averaged to make the prediction for the multi-view data. The bar graph 606 demonstrates that, in this experiment, processing 3D RI tomograms enabled the classification neural network to make the most accurate bacterial species prediction. The accuracy of the trained classification neural network was 74.2%, 92.2%, and 94.6% for 2D, multi-view, and 3D tomograms respectively, and 49.6%, 75.9%, and 92.4% for the corresponding binary mask input data.

Figure 6D:
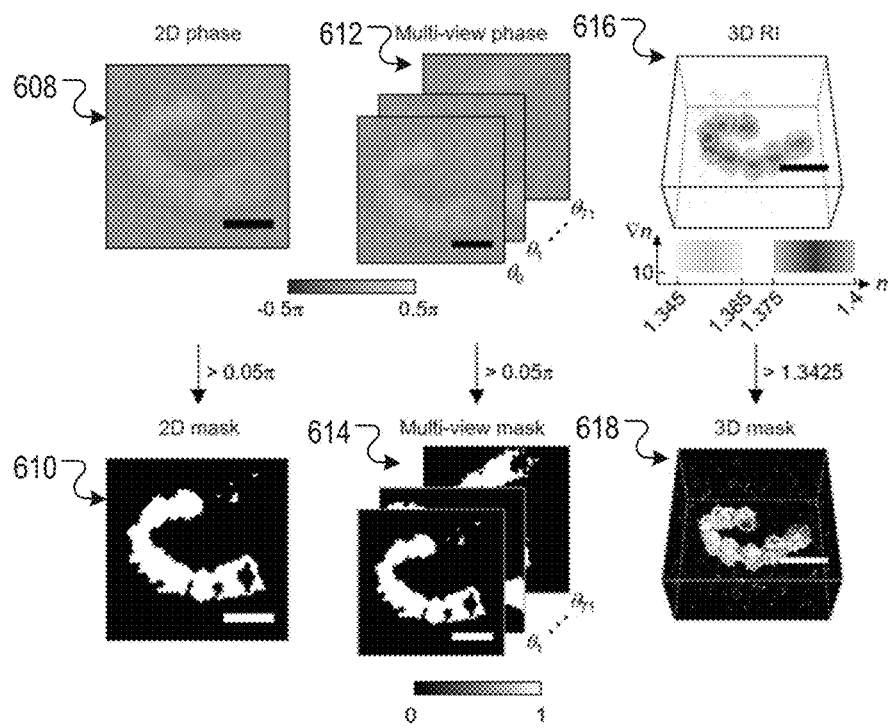

FIG. 6D is an illustration of a 2D phase image 608 that is thresholded at $0.05\pi$ to generate a corresponding binary mask image 610, a set of multi-view phase delay images 612 from multiple illumination angles that are each thresholded at $0.05\pi$ to generate corresponding binary mask images 614, and a 3D RI tomogram 616 that is thresholded at 1.3425 to generate a corresponding binary mask image 618. The scale bar represents 2 μm.

Figure 6E:
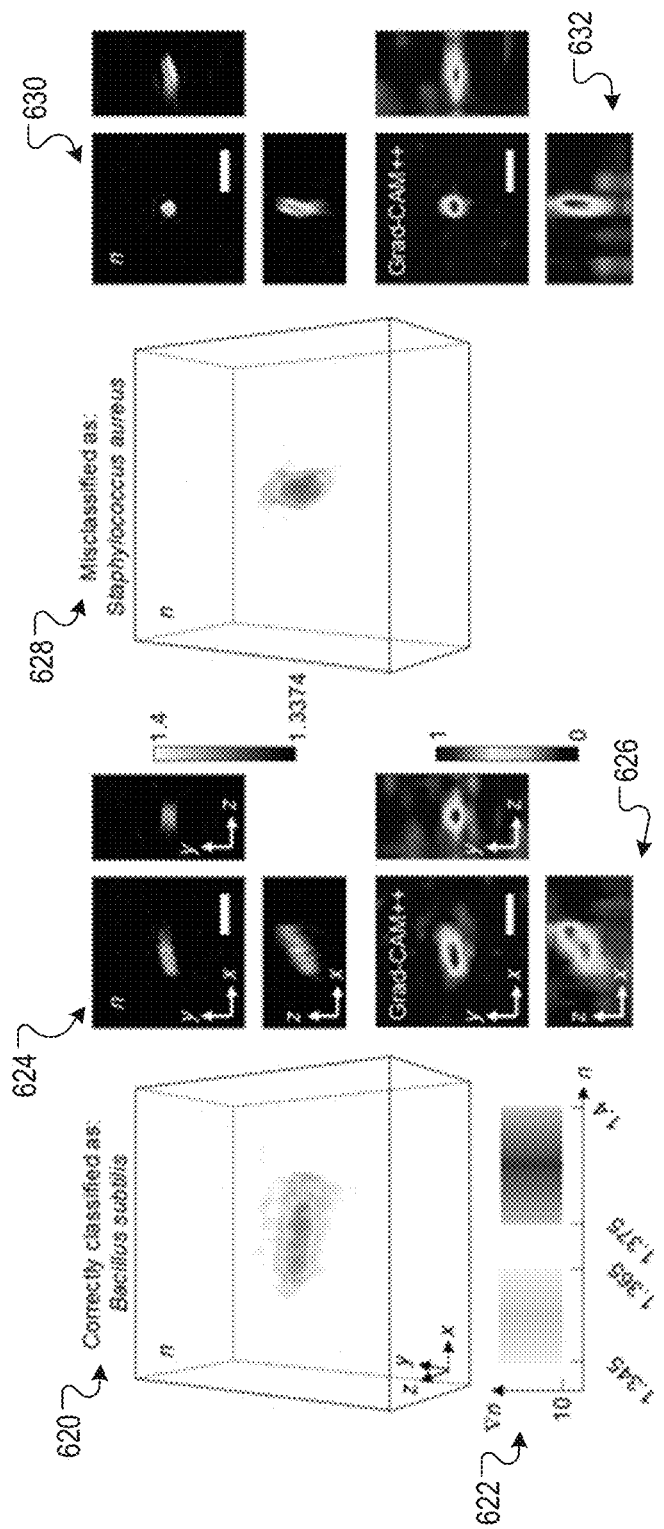

FIG. 6E illustrates a 3D RI tomogram 620 that was correctly classified by the trained classification neural network and a 3D RI tomogram 628 that was misclassified by the trained classification neural network. The 3D RI tomogram 620 depicts a *Bacillus subtilis* bacterium, 624 depicts three cross-sections of the 3D RI tomogram 620, and 626 depicts three cross-sections of a saliency map that was generated for the 3D RI tomogram 620 using Grad-CAM++ techniques. The intensity of a point in the saliency map for a 3D RI tomogram can be understood as indicating the importance of the point to the prediction generated by the trained classification neural network for the 3D RI tomogram. The 3D RI tomogram 628 depicts a *Staphylococcus aureus* bacterium, 630 depicts three cross-sections of the 3D RI tomogram 628, and 632 depicts three cross-sections of a saliency map that was generated for the 3D RI tomogram 628 using Grad-CAM++ techniques. The scale bar represents 2 μm. The legend 622 characterizes the visualization of the 3D RI tomograms 620 and 628; the horizontal axis represents the refractive index value (which can be unit less) and the vertical axis represents the gradient of the refractive index (which can be expressed in arbitrary units). For example, the darker regions of the visualizations 620 and 628 correspond to the portion of the 3D RI tomogram having a refractive index in the range 1.375 to 1.4 with refractive index gradient greater than 10.

Figure 6F:
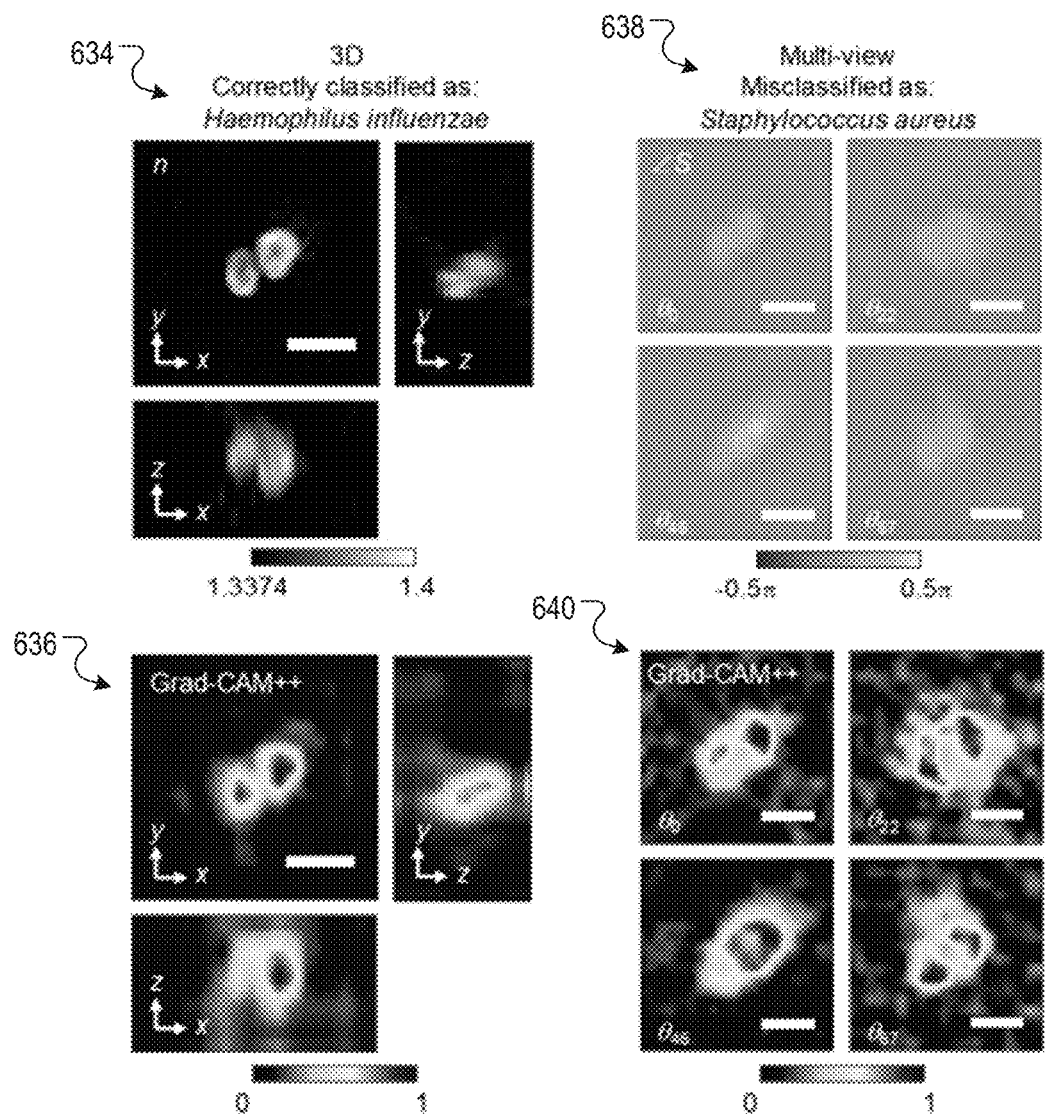

FIG. 6F illustrates three cross-sections 634 of a 3D RI tomogram depicting a *Haemophilus influenzae* bacterium that was correctly classified by the trained classification neural network by processing the 3D RI tomogram, and three cross-sections 636 of a saliency map that was generated for the 3D RI tomogram using Grad-CAM++ techniques. 638 shows a set of multi-angular 2D phase images of the same *Haemophilus influenzae* bacterium that were processed by the trained classification neural network (i.e., with a 2D convolutional architecture) and misclassified as depicting a *Staphylococcus aureus* bacterium, and 640 shows a respective saliency map that was generated for each of the 2D phase images 638 using Grad-CAM++ techniques. The scale bar represents 2 μm.

Figure 6G:
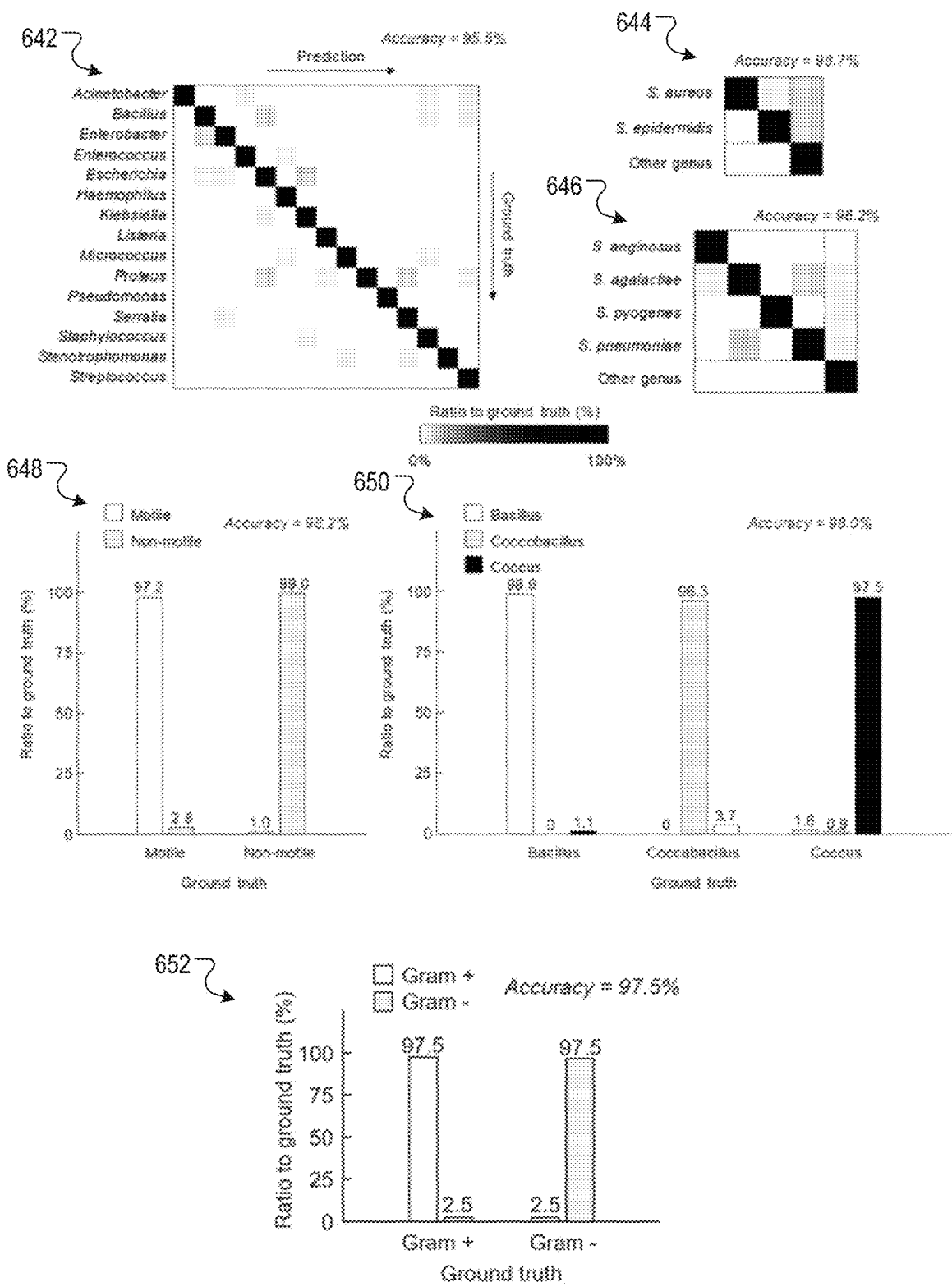

FIG. 6G illustrates examples of how accurately various properties of bacteria (e.g., genera, motility, morphology, gram-stainability, and aerobicity) can be identified using the trained classification neural network. Properties of a set of one or more bacteria can be identified by processing a 3D RI tomogram of the bacteria using the trained classification neural network to predict the species of the bacteria, and then identifying the properties of the bacteria based on the predicted species of the bacteria. The table 642 characterizes the accuracy (overall: 95.5%) of using the trained classification neural network in identifying the 15 genera of the 19 sepsis-inducing bacterial species. The table 644 characterizes the accuracy (overall: 98.7%) of using the trained classification neural network in identifying the species of the bacteria belonging to the *Staphylococcus* genus. The table 646 characterizes the accuracy (overall: 96.2%) of using the trained classification neural network in identifying the species of the bacteria belong to the *Streptococcus* genus. The bar graph 648 characterizes the accuracy (overall: 98.2%) of using the trained classification neural network in identifying the motility of the bacteria. The bar graph 650 characterizes the accuracy (overall: 98.0%) of using the trained classification neural network in identifying the morphology of the bacteria in three groups: *Bacillus*, *Coccobacillus*, and *Coccus*. The bar graph 652 characterizes the accuracy (overall: 97.5%) of using the trained classification neural network in identifying the gram-stainability of the bacteria. Using the trained classification neural network to identify the aerobicity of the bacteria achieved an overall accuracy of 98.2%.

Figure 7:
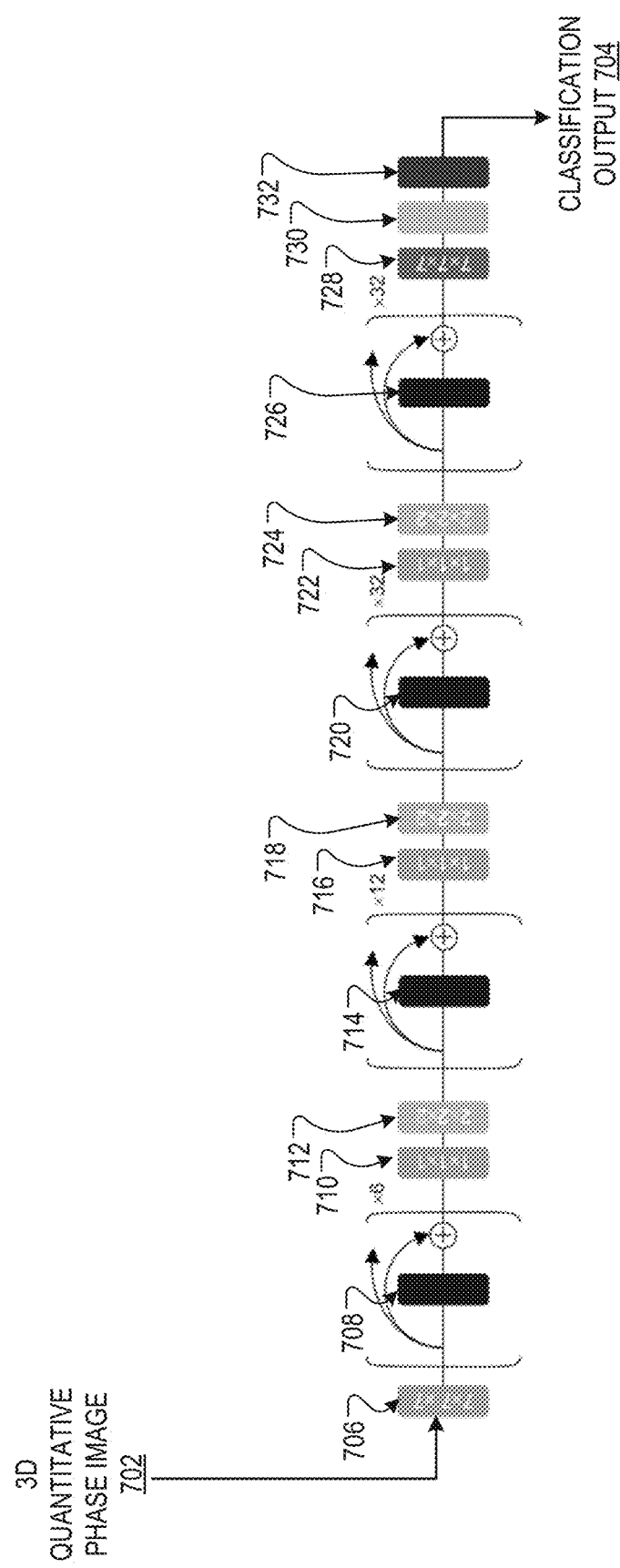
FIG. 7 is an illustration of an example architecture of a classification neural network configured to process a 3D QPI of a microorganism to generate a classification output that characterizes a predicted type of the microorganism.

FIG. 7 is an illustration of an example architecture of a classification neural network configured to process a 3D QPI 702 of a microorganism to generate a classification output 704 that characterizes a predicted type of the microorganism. The architecture has a sequence of layers including, in order: a 3D convolutional layer 706 with convolutional filters of dimension 7×7×7, a sequence of 6 bottleneck layers 708 (where skip-connections cause the input to each bottleneck layer after the first bottleneck layer to include the sum of the output of the previous bottleneck layer and the input to the first bottleneck layer), a 3D convolutional layer 710 with 1×1×1 convolutional filters, a 3D 2×2×2 average pooling layer 712, a sequence of 12 bottleneck layers 714, a 3D convolutional layer 716 with 1×1×1 convolutional filters, a 3D 2×2×2 average pooling layer 718, a sequence of 32 bottleneck layers 720, a 3D convolutional layer 722 with 1×1×1 convolutional filters, a 3D 2×2×2 average pooling layer 724, a sequence of 32 bottleneck layers 726, a 3D 7×7×7 global average pooling layer 728, a fully-connected layer 730, and a soft-max output layer 732.

Certain hyper-parameters of the classification neural network can be chosen based on the nature of the prediction being made by the classification neural network. For example, the dimensionalities of the filters of one or more convolutional layers of the classification neural network can be selected based on the (known) sizes of bacteria of the bacterial species being predicted.

Figure 8:
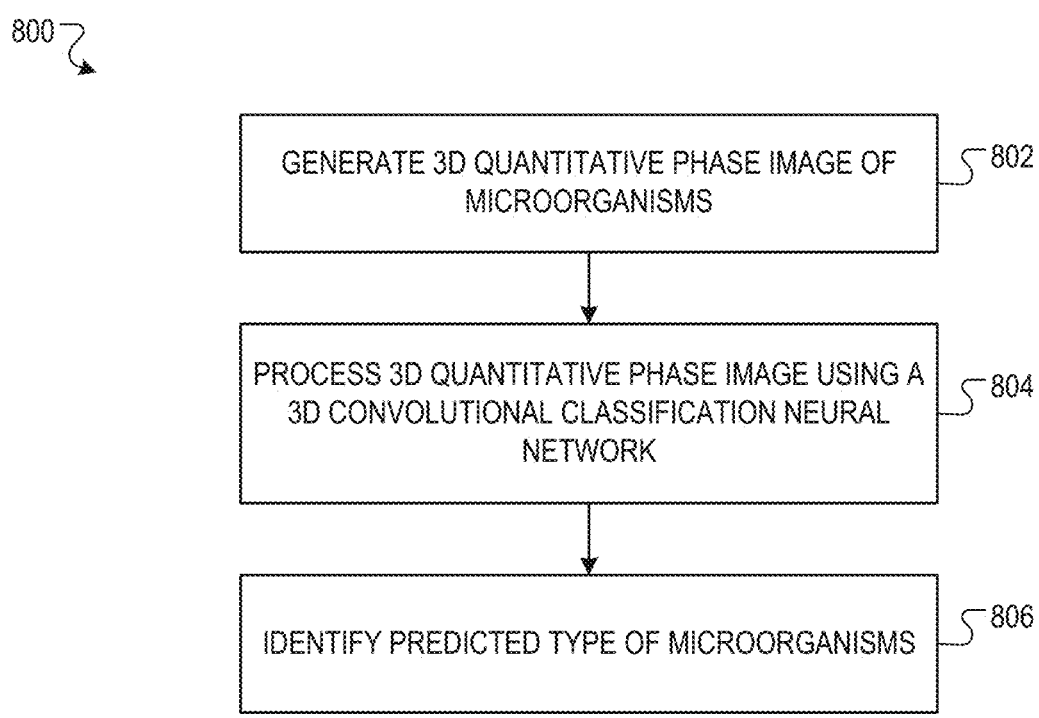
FIG. 8 is a flow diagram of an example process for identifying a predicted type of one or more microorganisms.

FIG. 8 is a flow diagram of an example process 800 for identifying a predicted type of one or more microorganisms.

A phase-contrast microscope is used to generate a 3D QPI of one or more microorganisms (802). The 3D QPI of the microorganisms includes a 3D representation of the microorganisms. The 3D QPI may, be for example, a 3D refractive index tomogram. The microorganisms may be, e.g., bacteria, viruses, or fungi. In a particular example, the microorganisms may be bacteria isolated from a blood sample of a patient with a bacterial infection.

The 3D QPI is processed using a classification neural network, in accordance with trained parameter values of the classification neural network, to generate a neural network output characterizing the microorganisms (804). The classification neural network may be a convolutional neural network that includes one or more 3D convolutional neural network layers. In one example, the neural network output defines a probability distribution over a predetermined number of possible microorganism types. In another example, the neural network output defines an index from a predetermined set of possible indices, where each index corresponds to a respective possible microorganism type.

The predicted type of the microorganisms is identified using the neural network output (806). In one example, the predicted type of the microorganisms may be identified as the microorganism type associated with the highest probability value by the neural network output. In another example, the predicted type of the microorganisms may be identified as the microorganism type corresponding to an index defined by the neural network output.

Figure 9:
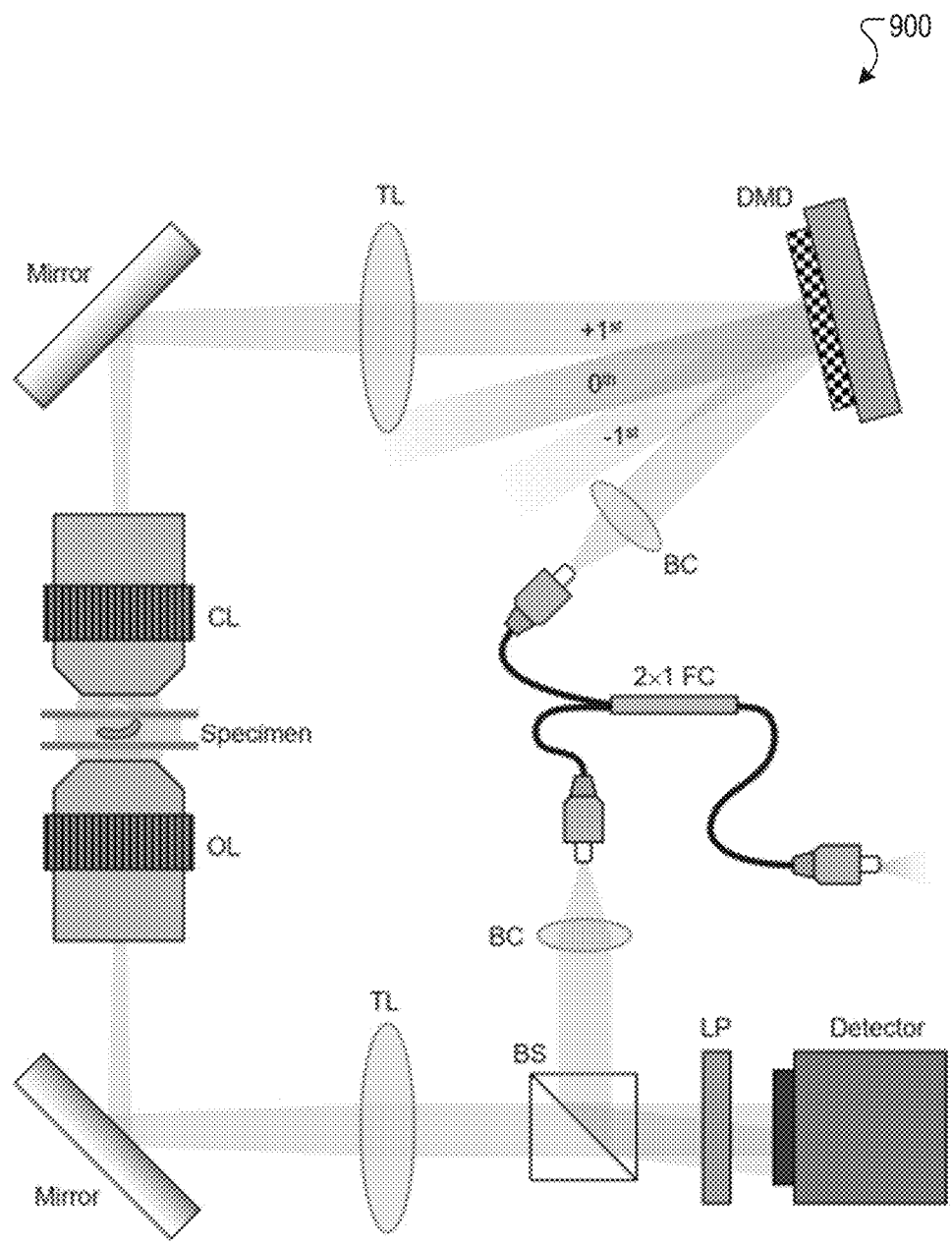
FIG. 9 is an illustration of a Mach-Zehnder phase-contrast microscope apparatus used to generate the 3D refractive index tomograms.

FIG. 9 is an illustration of an exemplary apparatus (a Mach-Zehnder phase-contrast microscope apparatus) 900 used to generate the 3D RI tomograms of the bacteria in the experiment described with reference to FIG. 6A-6G. A set of multidirectional 2D QPI measurements were assembled in the spatial frequency domain to generate a 3D RI tomogram using optical diffraction tomography (ODT) techniques. Each 2D QPI measurement was acquired using off-axis holography. The incident angle of the light illuminating the specimen (e.g., bacterial sample) was controlled using a digital micro-mirror device (DMD), that is, using the $+1^{st}$ order beam diffracted by the grating pattern on the DMD. Using a continuous wave laser of 532 nm wavelength and two water-immersion objective lenses of 1.2 numerical aperture, the optical resolution was 110 nm in the horizontal axes and 330 nm in the vertical axis according to the Nyquist theorem. The 3D RI tomograms were resampled with 100 nm wide and 200 nm high voxels. In the illustration of the apparatus 6900, "BC" refers to beam collimator, "BS" refers to beam splitter, "CL" refers to condenser lens, "FC" refers to fiber coupler, "LP" refers to linear polarizer, "OL" refers to objective lens, and "TL" refers to tube lens.

Generally, any appropriate apparatus can be used to generate 3D RI tomograms. Another example of an apparatus that can be used to generate 3D RI tomograms is described with reference to: K. Kim, H. Yoon, M. Diez-Silva, M. Dao, R. R. Dasari, and Y. Park: "High-resolution three-dimensional imaging of red blood cells parasitized by *Plasmodium falciparum* and in situ hemozoin crystals using optical diffraction tomography," *Journal of Biomedical Optics* 19(1), 011005 (25 Jun. 2013), which is incorporated by reference herein for purposes of the apparatus disclosed in the article. Another example of an apparatus that can be used to generate 3D RI tomograms is described with reference to: F. Charriere, A. Marian, F. Montfort, J. Kuehn, T. Colomb, E. Cuche, P. Marquet, and C. Depeursinge: "Cell refractive index tomography by digital holographic microscopy," *Optics Letters*, 31(2), pp. 178-180 (2006), which is incorporated by reference herein for purposes of the apparatus disclosed in the article.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow™ framework, a Microsoft Cognitive Toolkit™ framework, an Apache™ Singa framework, or an Apache™ MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

While certain embodiments have been described, the disclosure is not limited to such embodiments.

As an example, while certain bacteria are disclosed above, in some embodiments, the bacteria may relate to a sexually transmitted infection, such as, for example, gonorrhea, syphilis, or chlamydia. In such embodiments, the microorganism classification system may identify the species of the bacteria as, for example, *Treponema pallidium, Mycoplasma genitalium, Neisseria gonorrhoeae, Ureaplasma parvum, Mycoplasma hominis, Ureaplasma urealyticum, Gardnerella vaginalis, Chlamydia trachomatis, Trichomonas vaginalis, Candida albicans* or *Haemophilus ducreyi*. The disclosure therefore provides a relatively rapid diagnosis of sexually transmitted infections, which can also yield a relatively rapid treatment of such infections.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:
   using a phase-contrast microscope to generate one or more three-dimensional (3D) quantitative phase images of one or more microscopic entities,
   wherein each of the 3D quantitative phase images comprises a respective 3D representation of the one or more microscopic entities as a 3D refractive index tomogram represented as a 3D matrix of numerical values, where each component of the 3D matrix corresponds to a respective 3D spatial position and defines a refractive index at the corresponding 3D spatial position; and
   processing the one or more 3D quantitative phase images using a neural network, wherein:
      the neural network is a convolutional neural network comprising one or more 3D convolutional layers, wherein each of the 3D convolutional layers performs operations comprising:
         receiving a layer input that comprises one or more 3D matrices of features derived from the one or more 3D quantitative phase images input to the neural network; and
         processing the layer input to generate a layer output, comprising convolving one or more 3D convolutional filters with the one or more 3D matrices included in the layer input; and
      the neural network is configured to process the one or more three-dimensional quantitative phase images in accordance with trained parameter values of the neural network to generate a neural network output characterizing the one or more microscopic entities; and
   classifying the one or more microscopic entities using the neural network output.

2. The method of claim 1, wherein one or more of the microscopic entities are microscopic organisms.

3. The method of claim 2, wherein one or more of the microscopic entities are multi-cellular organisms.

4. The method of claim 1, wherein each of the one or more 3D quantitative phase images is captured at a different time point.

5. The method of claim 1, wherein:
   the neural network output comprises a respective probability value for each of a predetermined number of possible classes; and
   the probability value for a given class indicates a likelihood that the one or more microscopic entities are included in the given class.

6. The method of claim 5, wherein each class represents a respective type of microscopic entity.

7. The method of claim 6, wherein a type of a microscopic entity characterizes one or more of: a genus of the microscopic entity, a species of the microscopic entity, a strain of the microscopic entity, a gram-stainability of the microscopic entity, a metabolism of the microscopic entity, a morphology of the microscopic entity, or a motility of the microscopic entity.

8. The method of claim 5, wherein classifying the one or more microscopic entities using the neural network output comprises:
   classifying the one or more microscopic entities as being included in a class associated with a highest probability value in the neural network output.

9. The method of claim 1, wherein the one or more microscopic entities are bacteria, or viruses, or fungi, or parasites, or microalgae.

10. The method of claim 9, wherein one or more of the microscopic entities are bacteria.

11. The method of claim 10, wherein the bacteria are present in a blood sample of a patient.

12. The method of claim 11, further comprising administering an antibiotic therapy to the patient based on the classification of the bacteria.

13. The method of claim 1, wherein using a phase-contrast microscope to generate one or more three-dimensional quantitative phase images of the one or more microscopic entities comprises:
   using the phase-contrast microscope to generate phase and amplitude images of the one or more microscopic entities at each of a plurality of illumination angles; and
   reconstructing a three-dimensional refractive index tomogram using the phase and amplitude images.

14. The method of claim 1, wherein the method takes at most one hour.

15. A system comprising:
   a phase-contrast microscope that is configured to generate one or more three-dimensional quantitative phase image of one or more microscopic entities,
   wherein each of the 3D quantitative phase images comprises a respective 3D representation of the one or more microscopic entities as a 3D refractive index tomogram represented as a 3D matrix of numerical values, where each component of the 3D matrix corresponds to a respective 3D spatial position and defines a refractive index at the corresponding 3D spatial position; and
   a microscopic entity classification system that is configured to perform operations comprising:
      processing the one or more 3D quantitative phase images using a neural network, wherein:
         the neural network is a convolutional neural network comprising one or more 3D convolutional layers, wherein each of the 3D convolutional layers performs operations comprising:
            receiving a layer input that comprises one or more 3D matrices of features derived from the one or more 3D quantitative phase images input to the neural network; and
            processing the layer input to generate a layer output, comprising convolving one or more 3D convolutional filters with the one or more 3D matrices included in the layer input; and
         the neural network is configured to process the one or more three-dimensional quantitative phase images in accordance with trained parameter values of the neural network to generate a neural network output characterizing the one or more microscopic entities; and classifying the one or more microscopic entities using the neural network output.

16. The system of claim 15, wherein one or more of the microscopic entities are microscopic organisms.

17. The system of claim 16, wherein one or more of the microscopic entities are multi-cellular organisms.

18. The system of claim 15, wherein each of the one or more 3D quantitative phase images is captured at a different time point.

19. The system of claim 15, wherein:

the neural network output comprises a respective probability value for each of a predetermined number of possible classes; and the probability value for a given class indicates a likelihood that the one or more microscopic entities are included in the given class.

20. The system of claim 19, wherein each class represents a respective type of microscopic entity.

* * * * *